US012315670B2

(12) United States Patent
Arai et al.

(10) Patent No.: US 12,315,670 B2
(45) Date of Patent: May 27, 2025

(54) MAGNETIC COUPLING COIL COMPONENT

(71) Applicant: TAIYO YUDEN CO., LTD., Tokyo (JP)

(72) Inventors: Takayuki Arai, Tokyo (JP); Naoya Terauchi, Tokyo (JP); Tomoo Kashiwa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 802 days.

(21) Appl. No.: 17/495,601

(22) Filed: Oct. 6, 2021

(65) Prior Publication Data

US 2022/0122765 A1 Apr. 21, 2022

(30) Foreign Application Priority Data

Oct. 16, 2020 (JP) ................................ 2020-175039

(51) Int. Cl.

| | |
|---|---|
| ***H01F 17/04*** | (2006.01) |
| ***H01F 27/255*** | (2006.01) |
| ***H01F 27/32*** | (2006.01) |
| ***H01F 41/04*** | (2006.01) |

(52) U.S. Cl.

CPC ........... *H01F 27/32* (2013.01); *H01F 27/255* (2013.01); *H01F 41/04* (2013.01)

(58) Field of Classification Search

CPC ....................................................... H01F 27/32

USPC .......................................................... 336/221

See application file for complete search history.

(56) References Cited

U.S. PATENT DOCUMENTS

2010/0176909 A1 7/2010 Yasuda et al.
2019/0214181 A1* 7/2019 Wang .................... H01F 27/306
2021/0358678 A1* 11/2021 Wang ...................... H01F 27/32

FOREIGN PATENT DOCUMENTS

JP 2009-117676 A 5/2009
JP 2010-027758 A 2/2010
JP 2022-033703 A 3/2022

OTHER PUBLICATIONS

Notice of Reasons for Refusal dated Apr. 30, 2024, issued in corresponding Japanese Patent Application No. 2020-175039, with English translation (10 pgs.).

* cited by examiner

*Primary Examiner* — Ronald Hinson

(74) *Attorney, Agent, or Firm* — Pillsbury Winthrop Shaw Pittman, LLP

(57) ABSTRACT

A magnetic coupling coil component according to one or more embodiments of the invention includes a magnetic base body, a first and second conductors disposed in a through-hole of the magnetic base body, and a non-magnetic portion disposed between the first and second conductors and having a relative magnetic permeability smaller than that of the magnetic base body. The magnetic base body has a mounting surface and the through-hole connecting first and second openings in the mounting surface. One end the first conductor is exposed through the first opening and the other end is exposed through the second opening. The second conductor is disposed at a position spaced away from the first conductor toward inside of the magnetic base body and is opposed to the first conductor. One end of the second conductor is exposed through the first opening and the other end is exposed through the second opening.

21 Claims, 23 Drawing Sheets

MAGNETIC COUPLING COIL COMPONENT

CROSS-REFERENCE TO RELATED APPLICATIONS

This application is based on and claims the benefit of priority from Japanese Patent Application Serial No. 2020-175039 (filed on Oct. 16, 2020), the contents of which are hereby incorporated by reference in its entirety.

TECHNICAL FIELD

The present disclosure relates to a magnetic coupling coil component.

BACKGROUND

Magnetic coupling coil components include two or more internal conductors that are magnetically coupled to each other as described in, for example, Japanese Patent Application Publication No. 2009-117676 ("the '676 Publication") and Japanese Patent Application Publication No. 2010-027758 ("the '758 Publication"). The magnetic coupling coil components are used as a common mode choke coil, a transformer, or a coupling inductor.

The two or more internal conductors in the magnetic coupling coil component are arranged in parallel with each other along a mounting surface, which increases the dimension of the magnetic coupling coil component along the mounting surface. In particular, for magnetic coupling coil components with internal conductors that are formed in the shape of thin plates such as ones described in the '676 Publication and the '758 Publication, it is difficult to reduce the dimension along the mounting surface because each internal conductor is arranged in a base body of the coil component such that its larger surface faces the mounting surface.

SUMMARY

One object of the present disclosure is to overcome or reduce at least a part of the above drawback. One particular object of the present disclosure is to provide a magnetic coupling coil component whose dimension in the direction along the mounting surface can be reduced. Other objects of the disclosure will be made apparent through the entire description in the specification. The invention disclosed herein may also address any other drawbacks in addition to the above drawback.

A magnetic coupling coil component according to one or more aspects of the invention includes: a magnetic base body; a first conductor and a second conductor disposed in a through-hole of the magnetic base body; and a non-magnetic portion disposed between the first conductor and the second conductor and having a relative magnetic permeability smaller than a relative magnetic permeability of the magnetic base body. According to one or more aspects of the invention, the magnetic base body has a mounting surface and a through-hole connecting a first opening and a second opening in the mounting surface. According to one or more aspects of the invention, the first conductor disposed in the through-hole such that one end thereof is exposed through the first opening and the other end thereof is exposed through the second opening. According to one or more aspects of the invention, the second conductor is disposed in the through-hole at a position spaced away from the first conductor toward inside of the magnetic base body and is opposed to the first conductor. According to one or more aspects of the invention, the second conductor is disposed such that one end thereof is exposed through the first opening and the other end thereof is exposed through the second opening.

According to one or more aspects of the invention, the first conductor is spaced away from the second conductor in a reference direction from the inside to outside of the magnetic base body in a section perpendicular to a direction of current flowing through the first conductor. According to one or more aspects of the invention, a first aspect ratio, which is a ratio of a dimension of the section of the first conductor in a direction perpendicular to the reference direction to a dimension of the section of the first conductor in the reference direction, is greater than one.

According to one or more aspects of the invention, a second aspect ratio, which is a ratio of a dimension of the section of the second conductor in a direction perpendicular to the reference direction to a dimension of the section of the second conductor in the reference direction, is greater than one.

According to one or more aspects of the invention, a sectional area of the first conductor cut in the section is larger than a sectional area of the second conductor cut in the section.

According to one or more aspects of the invention, a dimension of the section of the second conductor in the reference direction is smaller than a dimension of the section of the first conductor in the reference direction.

According to one or more aspects of the invention, a sectional area of the second conductor cut in the section is larger than a sectional area of the first conductor cut in the section.

According to one or more aspects of the invention, a dimension of the section of the first conductor in the reference direction is smaller than a dimension of the section of the second conductor in the reference direction.

According to one or more aspects of the invention, the through hole communicates with outside of the magnetic base body through a third opening in the upper surface of the magnetic base body, and a part of the first conductor is exposed to the outside of the magnetic base through the third opening in the upper surface.

According to one or more aspects of the invention, the first conductor has a convex portion that protrudes toward the inside of the magnetic base body in the section, and the second conductor has a concave portion that has a shape complementary to the convex portion and accepts at least a portion of the convex portion.

According to one or more aspects of the invention, the first conductor has, on its inner peripheral surface facing the second conductor, a concave portion that dents toward outside of the magnetic base body in a section perpendicular to a direction of current flowing through the first conductor, and at least a part of the second conductor is received in the recess.

According to one or more aspects of the invention, the second conductor has a convex portion that protrudes toward outside of the magnetic base body in the section, and the concave portion receives at least a part of the convex portion.

According to one or more aspects of the invention, the non-magnetic portion is air.

According to one or more aspects of the invention, the first conductor includes a first unit member and a second unit member, the second member is disposed on an inner side of the magnetic base body than the first unit member, one end of the first unit member is exposed through the first opening and the other end of the first unit member is exposed through the second opening, and one end of the second unit member is exposed through the first opening and the other end of the second unit member is exposed through the second opening.

According to one or more aspects of the invention, in a cross section passing through the first conductor, the second conductor, the upper surface, and the mounting surface, a shortest distance between an axis line of the first conductor and the top surface is less than one-half a distance between the upper surface and the mounting surface.

According to one or more aspects of the invention, the magnetic body contains a plurality of metal magnetic particles.

According to one or more aspects of the invention, the magnetic base body includes a first member and a second member bonded to the first member via a bonding layer.

According to one or more aspects of the invention, the magnetic base body has an upper surface facing the mounting surface, a first end surface connecting the mounting surface and the upper surface, and a second end surface facing the first end surface, and the distance between the upper surface and the mounting surface is greater than the distance between the first end surface and the second end surface.

According to one or more aspects of the invention, at least one of the first conductor or the second conductor is covered by an insulating film.

Another aspect of the invention relates to a circuit board including any one of the above magnetic coupling coil components. Yet another aspect of the invention relates to an electronic device including the above circuit board.

Advantageous Effects

The invention disclosed herein can provide a magnetic coupling coil element that can achieve a smaller size in a direction along a mounting surface.

DESCRIPTION OF THE EMBODIMENTS

Figure 1:
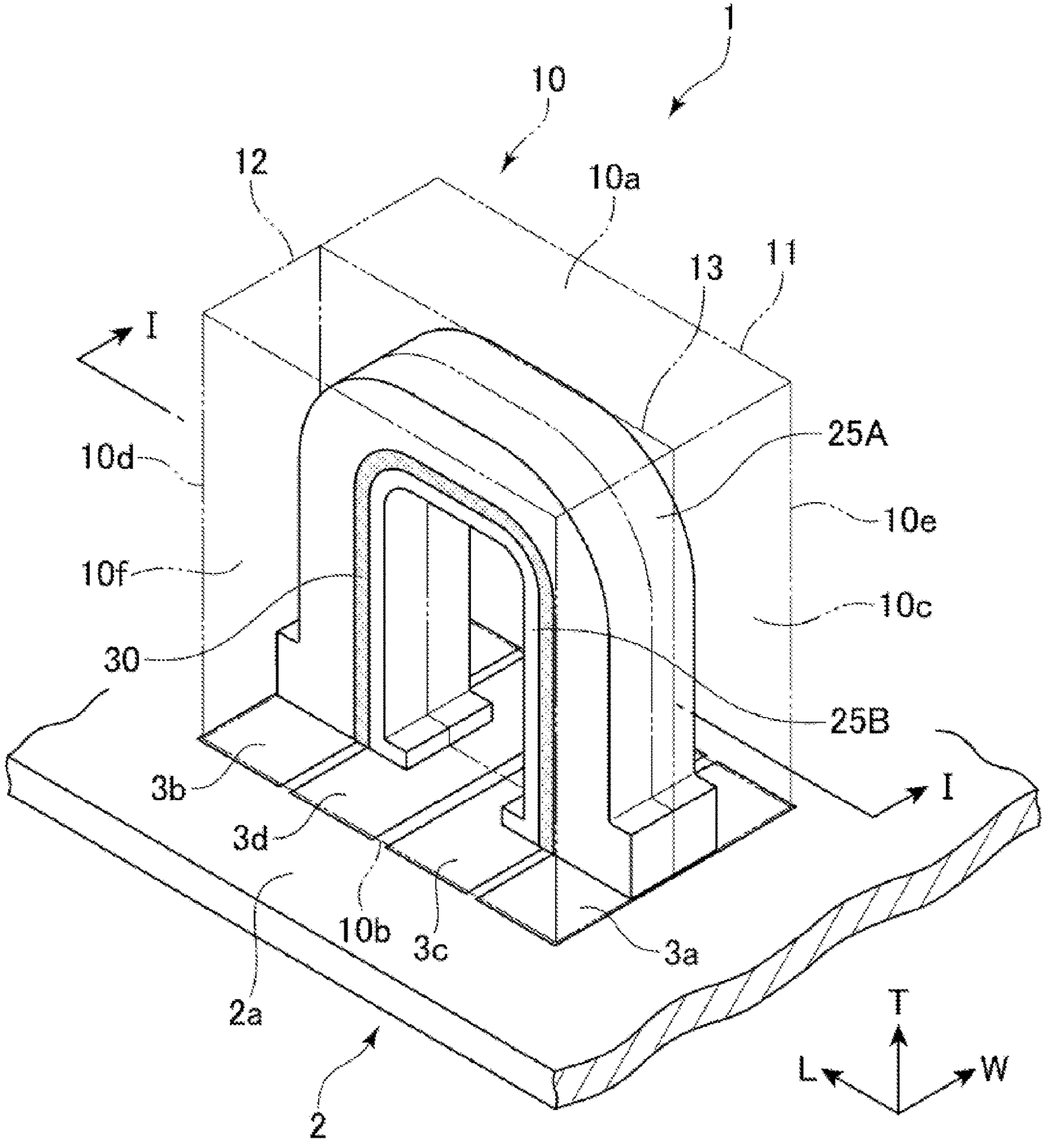
FIG. 1 is a perspective view of a magnetic coupling coil component according to one embodiment of the invention mounted on a circuit board.

Various embodiments of the present invention will be hereinafter described with reference to the accompanying drawings. Reference characters designating corresponding components are repeated as necessary throughout the drawings for the sake of consistency and clarity. It should be noted that the drawings are not necessarily drawn to an accurate scale for the sake of convenience of explanation.

Figure 2:
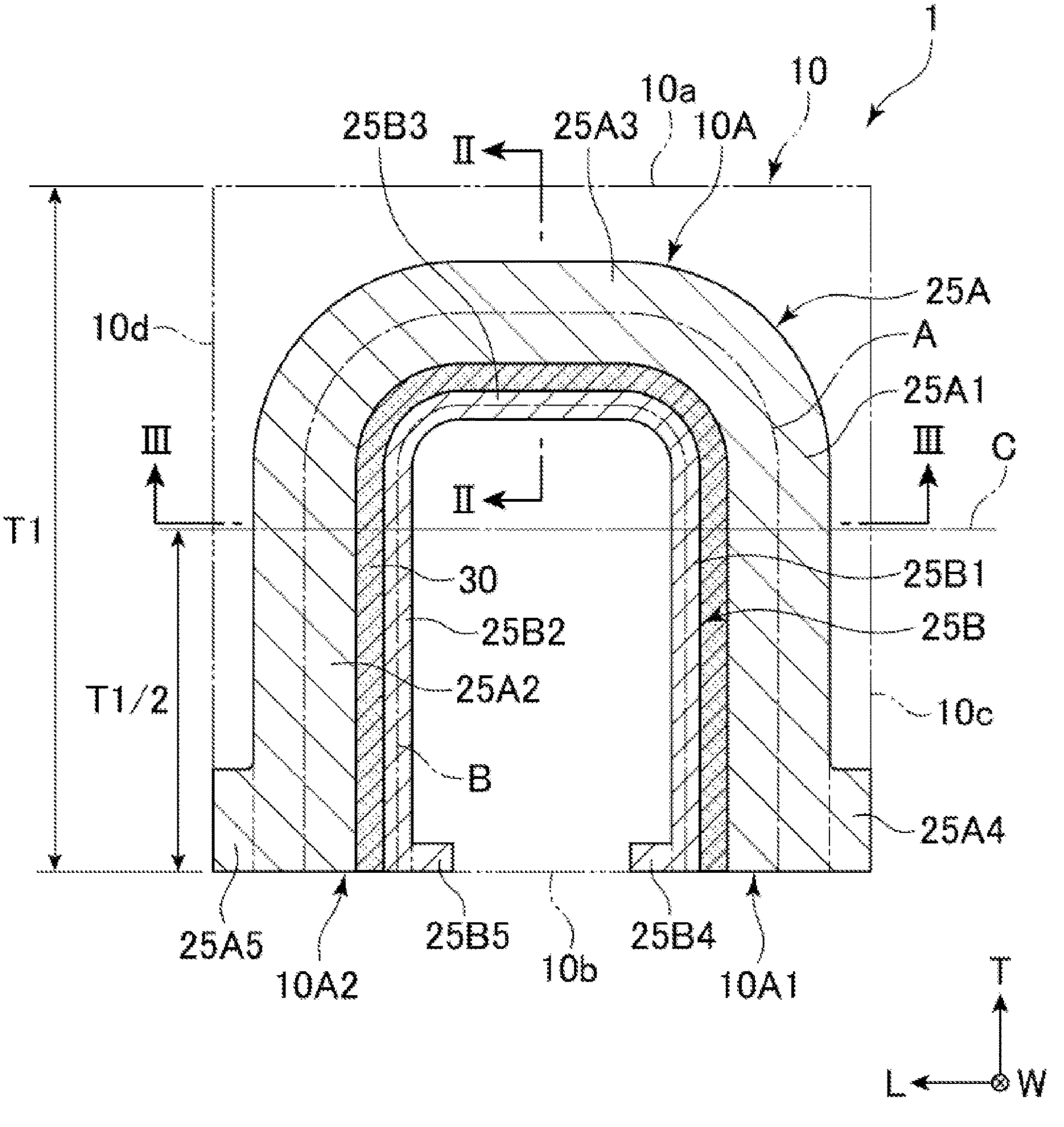
FIG. 2 is a sectional view of the magnetic coupling coil component along the line I-I of FIG. 1.
Figure 3:
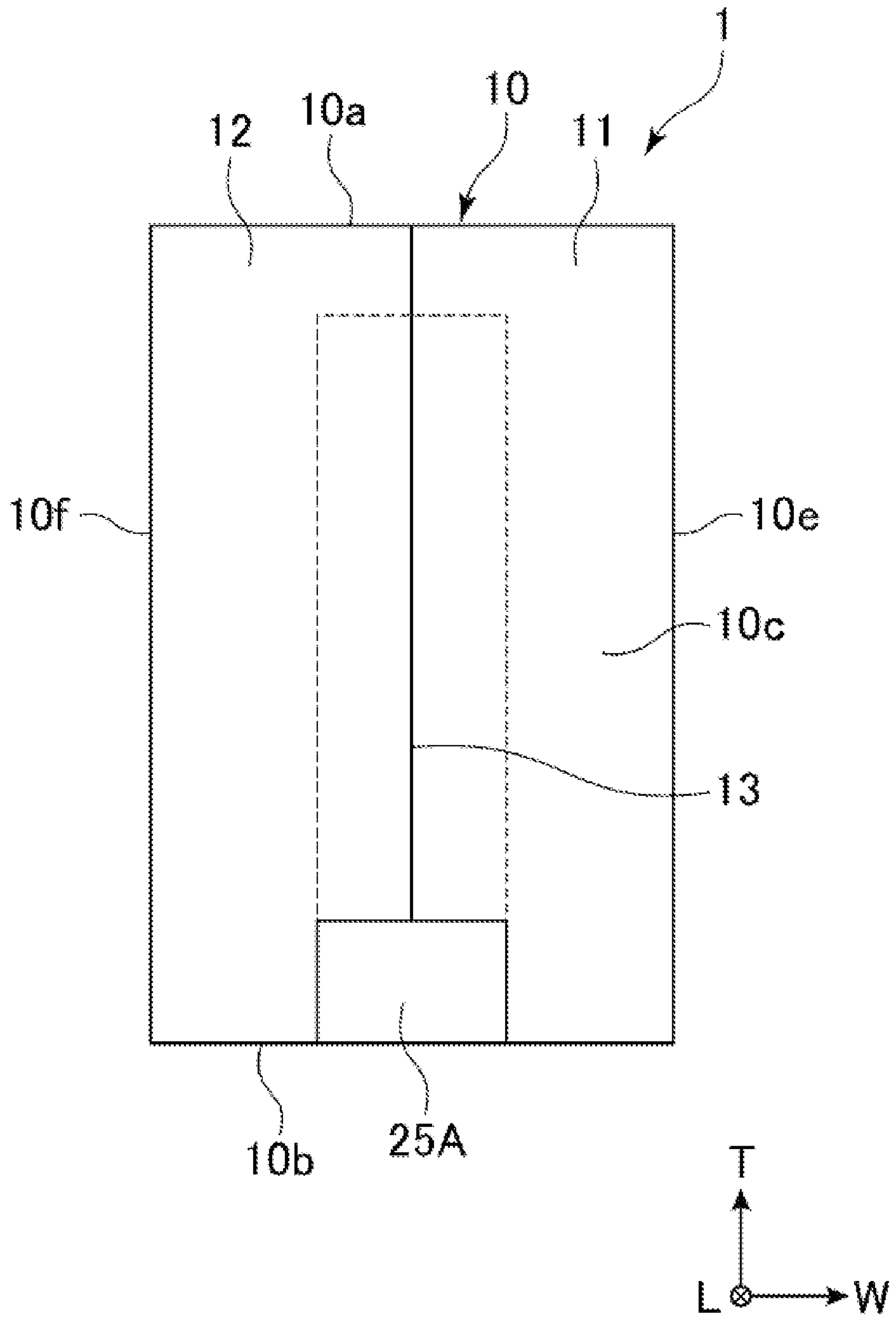
FIG. 3 is a right side view of the magnetic coupling coil component of FIG. 1.
Figure 4:
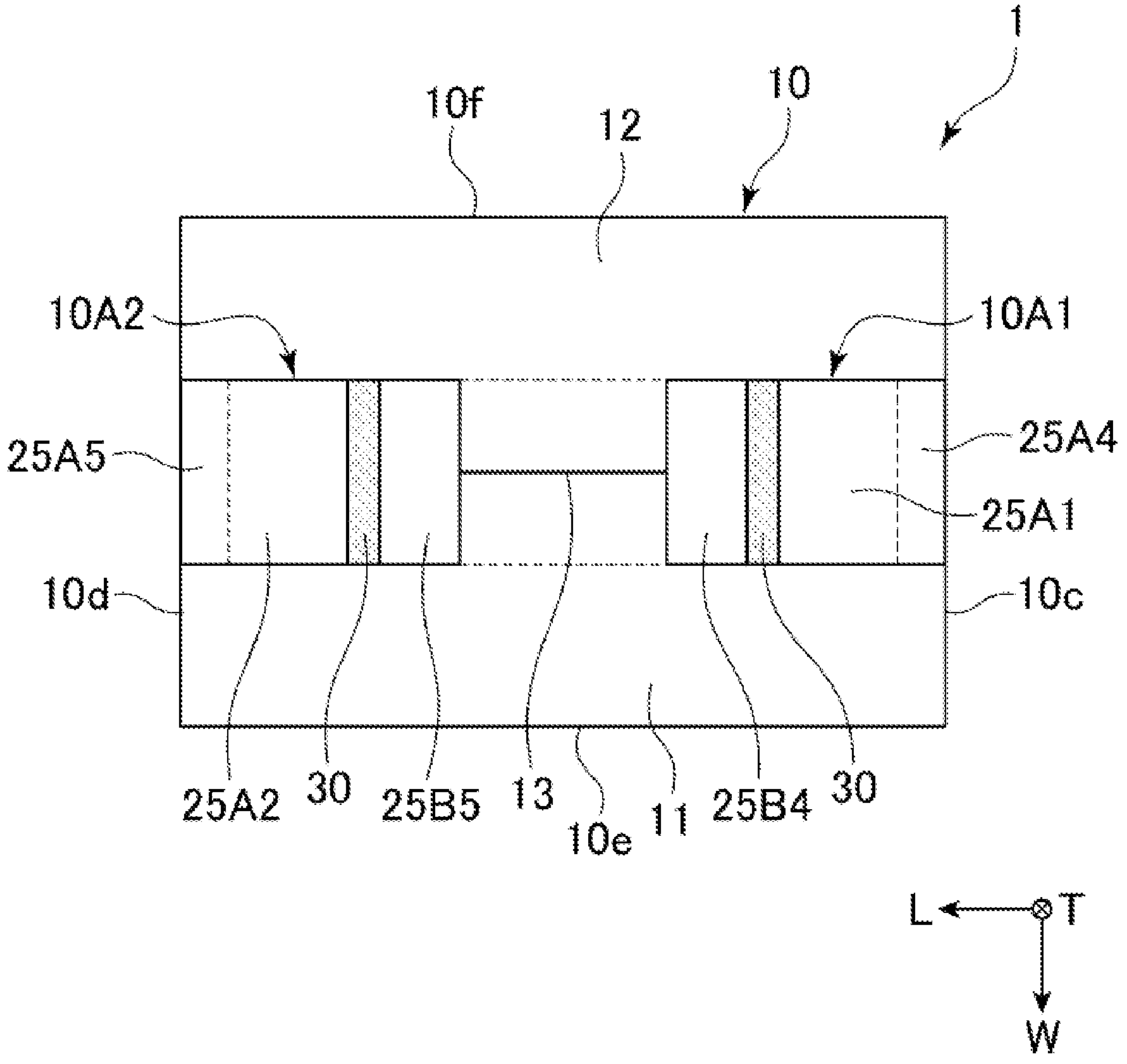
FIG. 4 is a bottom view of the magnetic coupling coil component of FIG. 1.

A magnetic coupling coil component 1 according to one embodiment of the invention will be hereinafter described with reference to FIGS. 1 to 8. With reference to FIGS. 1 and 4, an outline is given of the magnetic coupling coil component 1. FIG. 1 is a perspective view of the magnetic coupling coil component according to the embodiment of the invention, FIG. 2 is a sectional view of the magnetic coupling coil component 1 along the line I-I of FIG. 1, FIG. 3 is a right side view of the magnetic coupling coil component 1, and FIG. 4 is a bottom view of the magnetic coupling coil component 1. As illustrated, the magnetic coupling coil component 1 includes a base body 10, a first conductor 25A and a second conductor 25B provided in a substantially U-shaped through-hole 10A formed in the base body 10, and a non-magnetic portion 30 provided between the first conductor 25A and the second conductor 25B. For the sake of brevity of description, the magnetic coupling coil component 1 may be herein referred to simply as the "coil component 1."

Each of the drawings shows the L axis, the W axis, and the T axis orthogonal to one another. In this specification, a "length" direction, a "width" direction, and a "thickness" direction of the coil component 1 are referred to as an "L" axis direction, a "W" axis direction, and a "T" axis direction in FIG. 1, respectively, unless otherwise construed from the context.

The coil component 1 is used in, for example, a large-current circuit through which a large electric current flows. The coil component 1 may be used in signal or high-frequency circuits. The coil component 1 may be used as a magnetic bead coupling coil component for noise suppression.

The coil component 1 may be mounted on a mounting substrate 2*a*. A circuit board 2 includes the coil component 1 and the mounting substrate 2*a* on which the coil component 1 is mounted. The mounting substrate 2*a* has lands 3*a* to 3*d* provided thereon. In the coil component 1, the first conductor 25A is connected to the land 3*a* at one end and to the land 3*b* at the other end. The second conductor 25B is connected to the land 3*c* at one end and to the land 3*d* at the other end. In this way, the coil component 1 is mounted on the mounting substrate 2*a* by bonding the first conductor 25A and the second conductor 25B to the corresponding lands 3*a* to 3*d*. The circuit board 2 can be installed in various electronic devices. The electronic devices in which the circuit board 2 may be installed include smartphones, tablets, game consoles, electrical components of automobiles, a server and various other electronic devices.

The base body 10 is made of a magnetic material and formed in a rectangular parallelepiped shape. In one embodiment of the invention, the base body 10 has a length (the dimension in the L axis direction) of 0.4 to 20 mm, a width (the dimension in the W axis direction) of 0.2 to 20 mm, and a thickness (the dimension in the T axis direction) of 0.2 to 40 mm. In an embodiment of the invention, the base body 10 may be formed such that the thickness is larger than the width or the length or both. In an embodiment of the invention, the base body 10 may be formed such that the thickness is larger than the width and the length. This allows the first and second conductors 25A, 25B to have high self-inductance since they extend in the T axis direction within the base body 10, which eliminates the need to increase the dimensions of the coil component 1 along the mounting surface in order to obtain a desired self-inductance.

The invention can be applied to a wide range of applications, from relatively small to relatively large magnetic coupling coil components. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has an upper surface 10*a*, a lower surface 10*b*, a first end surface 10*c*, a second end surface 10*d*, a first side surface 10*e*, and a second side surface 10*f*. These six surfaces define the outer periphery of the base body 10. The upper surface 10*a* and the lower surface 10*b* are opposed to each other, the first end surface 10*c* and the second end surface 10*d* are opposed to each other, and the first side surface 10*e* and the second side surface 10*f* are opposed to each other. The first end surface 10*c* and the second end surface 10*d* connect the upper surface 10*a* and the lower surface 10*b*, and also connect the first side surface 10*e* and the second side surface 10*f*. The coil component 1 is disposed such that the lower surface 10*b* faces the mounting substrate 2*a*, and therefore, the lower surface 10*b* may be herein referred to as a "mounting surface" or the "mounting surface 10*b*".

The base body 10 is made of a magnetic material. The magnetic material for the base body 10 may contain a plurality of metal magnetic particles. The metal magnetic particles contained in the magnetic material for the base body 10 are, for example, particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the base body 10 is not limited to those described above. For example, the metal magnetic particles contained in the base body 10 may be particles of a Co—Nb—Zr alloy, an Fe—Zr—Cu—B alloy, an Fe—Si—B alloy, an Fe—Co—Zr—Cu—B alloy, an Ni—Si—B alloy, or an Fe—Al—Cr alloy. The Fe-based metal magnetic particles contained in the base body 10 may contain 80 wt % or more Fe. An insulating film may be formed on the surface of each of the metal magnetic particles. The insulating film may be an oxide film made of an oxide of the above metals or alloys. The insulating film provided on the surface of each of the metal magnetic particles may be, for example, a silicon oxide film provided by the sol-gel coating process.

In one embodiment, the average particle size of the metal magnetic particles is from 0.1 μm to 20 μm. The average particle size of the metal magnetic particles contained in the base body 10 may be smaller than 0.1 μm or larger than 20 μm. The base body 10 may contain two or more types of metal magnetic particles having different average particle sizes. For example, the metal magnetic particles for a composite magnetic material may include first metal magnetic particles having a first average particle size and second metal magnetic particles having a second average particle size smaller than the first average particle size.

The base body 10 may be formed of a composite magnetic material containing the metal magnetic particles and a binder. When the base body 10 is formed of the composite magnetic material, the binder included in the composite magnetic material is, for example, a thermosetting resin with excellent insulation properties. Examples of the binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin. Also, the binder may be the oxide film on the surface of each metal magnetic particle or an oxide other than the oxide film. The binder may be preferably an inorganic material with high thermal conductivity. The metal magnetic particles may be bound together by these oxides. For example, it is desirable that the content ratio of the binder in the base body 10 be 5 wt % or less, and the remainder be metal magnetic particles. It is more desirable that the content ratio of the binder in the base body 10 be 3 wt % or less.

The base body 10 may be formed of a ferrite material. An example of such ferrite material for the base body 10 includes a Ni—Cu—Zn-based ferrite, a Ni—Cu—Zn—Mg-based ferrite, a Cu—Zn-based ferrite, an Ni—Cu-based ferrite, a Mn—Zn-based ferrite, or any other known ferrite materials.

In one or more embodiments of the invention, the base body 10 may have a relative magnetic permeability of 30 to 5000. In one or more embodiments of the invention, the base body 10 may have a low relative magnetic permeability of less than 100, for example, within a range of 30 to 60 (both inclusive). In one embodiment, the relative magnetic permeability of the base body 10 may be in the range of 40 to 60. The base body 10 having a relative magnetic permeability of 30 to 60 can be obtained, for example, when metal magnetic particles are used as the magnetic material, or when a composite magnetic material containing the metal magnetic particles and the binder is used.

In one or more embodiments of the invention, the base body 10 includes a first member 11, a second member 12, and a bonding layer 13 disposed between the first member 11 and the second member 12. The base body 10 may be formed by bonding the first member 11 and the second member 12 together with an adhesive. In this case, the cured adhesive becomes the bonding layer 13. The bonding layer 13 may be provided such that it overlaps the first conductor 25A and the second conductor 25B when the coil component 1 is viewed from the side (i.e., the viewpoint of FIG. 3). The bonding layer 13 may be arranged at various positions depending on the shapes of the first member 11 and the second member 12. Alternatively, the bonding layer 13 may be disposed such that it does not overlap with the first conductor 25A and the second conductor 25B when the coil component 1 is viewed from the side. The bonding layer 13 may be provided such that it covers the entire bonding surface where the first member 11 and an second member 12 are bonded. In this case, the bonding layer 13 serves as a magnetic gap. The bonding layer 13 may be provided only on a part of the bonding surface where the first member 11 and the second member 12 are bonded. In this case, the bonding surface where the first member 11 and the second member 12 are bonded to each other includes a portion where these members directly contact each other without the bonding layer 13. There may be a void space inside or in the surface of the bonding layer 13. For example, when the bonding layer 13 is a hardened adhesive, the inside or surface of the bonding layer 13 may contain air bubbles. The bonding layer 13 on the bonding surface where the first member 11 and the second member 12 are bonded and the air in a void space where the first member 11 and the second member 12 do not directly contact each other serve as the magnetic gap.

Figure 7:
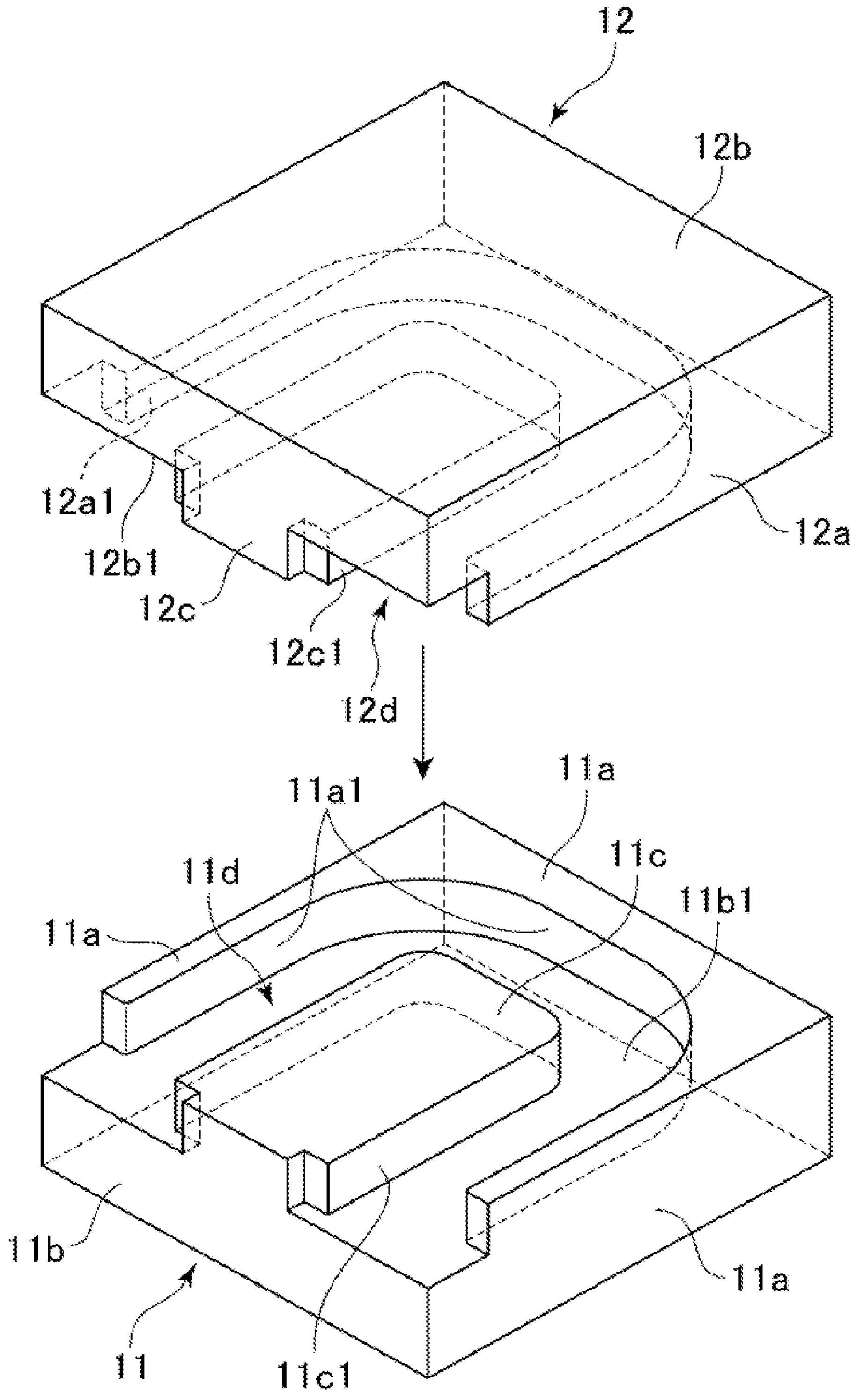
FIG. 7 is a schematic exploded view of a base body of the magnetic coupling coil component of FIG. 1.
Figure 8:
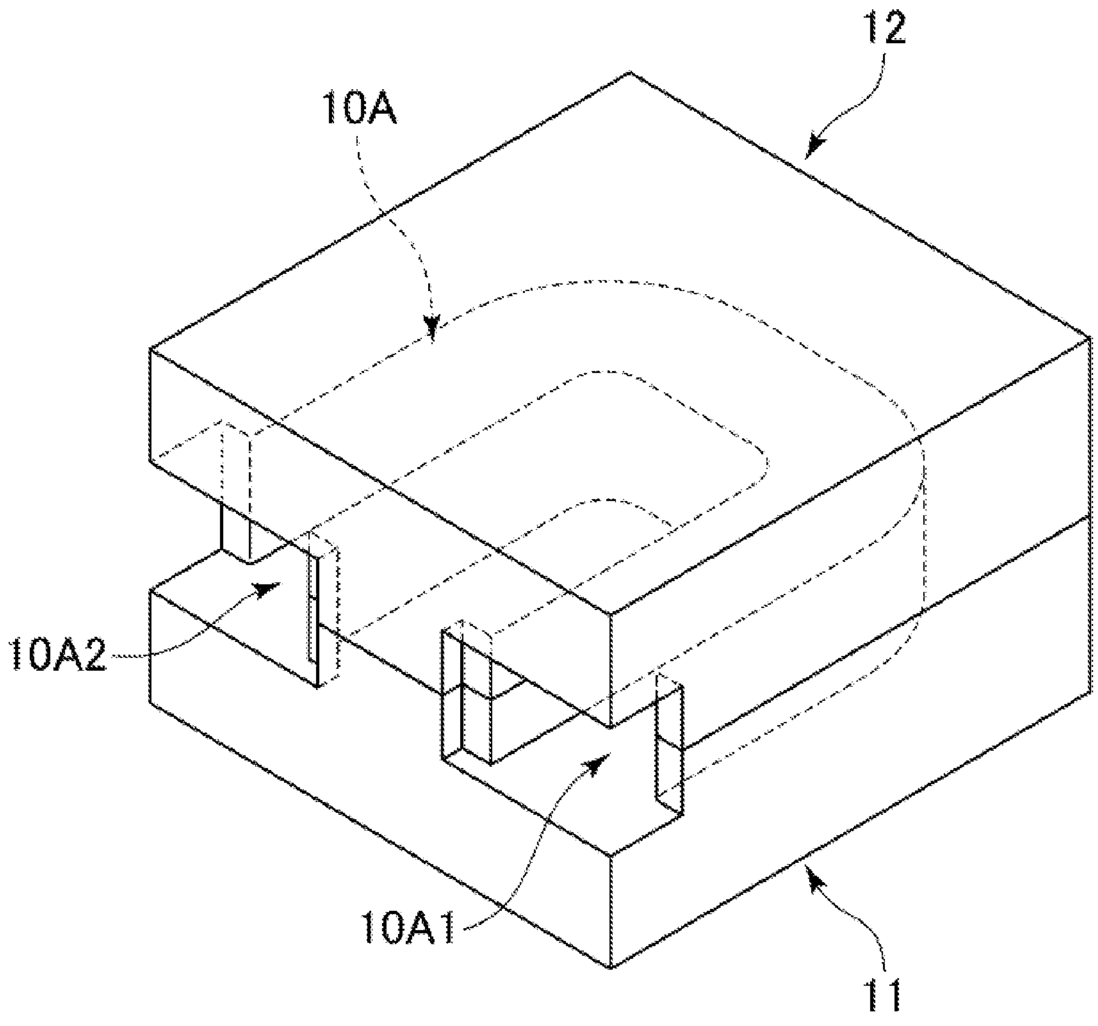
FIG. 8 schematically illustrates an assembled base body.

As shown in FIGS. 7 and 8, the first member 11 includes a plate-shaped base portion 11*b*, a raised portion 11*c* rising from the base portion 11*b*, and three wall portions 11*a* provided on outer edges of the base portion 11*b* such that they surround the raised portion 11*c* from three directions. The heights of the three wall portions 11*a* and the raised portion 11*c* from the base 11*b* may be the same to each other. Alternatively, the heights of the three wall portions 11*a* and the raised portion 11*c* from the base portion 11*b* may be different from each other. In the first member 11, inner surfaces 11*a*1 of the three wall portions 11*a*, an upper surface 11*b*1 of the base portion 11*b*, and an outer surface 11*c*1 of the raised portion 11*c* define a substantially U-shaped groove 11*d*. The second member 12 has the same or similar shape as the first member 11. In the illustrated embodiment, the second member 12 includes a plate-shaped base portion 12*b*, a raised portion 12*c* rising from the base portion 12*b*, and three wall portions 12*a* provided on outer edges of the base portion 12*b* such that they surround the raised portion 12*c* from three directions. In the second member 11, an inner surface 12*a*1 of the three wall portions 12*a*, an upper surface 12*b*1 of the base portion 12*b*, and an outer surface 12*c*1 of the raised portion 12*c* define a substantially U-shaped groove 12*d*. The three wall portions 11*a* of the first member 11 are bonded to the three corresponding wall portions 12*a* of the second member 12, and the raised portion 11*c* of the first member 11 is bonded to the raised portion 12*c* of the second member 12 to form the base body 10. The sum of the height of the wall portion 11*a* from the base portion 11*b* and the height of the wall portion 12*a* from the base portion 12*b* is equal to the sum of the height of the raised portion 11*c* from the base portion 11*b* and the height of the raised portion 12*c* from the base portion 12*b*. The raised portion 11*c* of the first member 11 and the raised portion 12*c* of the second member 12 bonded to the raised portion 11*c* may be herein collectively referred to as an inner core. The first member 11 and the second member 12 are bonded to each other via the bonding layer 13. The bonding layer 13 has a lower relative magnetic permeability than the first and second members 11, 12, which are made of a magnetic material, because it is formed by hardening the adhesive that bonds the first and second members 11, 12. When the bonding layer 13 is provided over the entire bonding surface of the first member 11 and the second member 12, the bonding layer 13 functions as a magnetic gap.

In the base body 10, a through-hole 10A is composed of the groove 11*d* of the first member 11 and the groove 12*d* of the second member 12. In other words, the through-hole 10A is defined by the inner surfaces 11*a*1 of the three wall portions 11*a*, the upper surface 11*b*1 of the base portion 11*b*, the outer surface 11*c*1 of the raised portion 11*c*, the inner surfaces 12*a*1 of the three wall portions 12*a*, the lower surface 12*b*1 of the base portion 12*b*, and the outer surface 12*c*1 of the raised portion 12*c*. Ends of the through-hole 10A opens to the outside of the base body 10 at first and second openings 10A1, 10A2 on the mounting surface 10*b*. In other words, the base body 10 has the first opening 10A1 and the second opening 10A2 in the mounting surface 10*b*, and the through-hole 10A is formed in the base body 10 such that it connects the first opening 10A1 and the second opening 10A2. In the illustrated embodiment, the through-hole 10A has the substantially U-shape in front view, but the shape of the through-hole 10A is not limited to the one shown in the drawing. Alternatively, the first and second openings 10A1 and 10A2 may be opened in the first and second end surfaces 10*c*, 10*d*, which are connected to the mounting surface 10*b* of the base body 10.

The first conductor 25A and the second conductor 25B are each formed of a metal material such as Ag or Cu having a high conductivity. The first conductor 25A and the second conductor 25B each have shapes corresponding to the through-hole 10A. In the illustrated embodiment, the through-hole 10A has the substantially U-shape in front view (viewed from the W axis direction) and therefore the first conductor 25A and the second conductor 25B also have a U-shape in front view. The first conductor 25A and the second conductor 25B may each be formed by bending a metal plate of metal material by electrical discharge machining or bending process. The first conductor 25A and the second conductor 25B may be formed by punching, cutting, or various any other known methods in addition to the electrical discharge machining or bending process. The first conductor 25A and the second conductor 25B may each include a Ni plating layer containing Ni and/or a Sn plating layer containing Sn on the surface of the metal plate. The surface of each of the first conductor 25A and the second conductor 25B may be provided with an insulating film made of polyamide-imide or any other insulating material that has a high insulation property. At least one of the first conductor 25A or the second conductor 25B may be a laminate fabricated by stacking a plurality of thin metal plates. In one or more embodiments of the invention, the plurality of metal plates forming the first conductor 25A and/or the second conductor 25B may be stacked in a direction from the inside of the base body 10 to the outside. In another embodiment of the invention, the plurality of metal plates forming the first conductor 25A and/or the second conductor 25B may be stacked in the W axis direction. The number of the stacking metal plates may be two or three or more.

The first conductor 25A is arranged such that it faces the inner surfaces 11*a*1 of the wall portions 11*a* and the inner surfaces 12*a*1 of the wall portions 12*a* that define the through-hole 10A. The first conductor 25A extends along an axis line A extending in the through-hole 10A from the first opening 10A1 to the second opening 10A2. When viewed in the viewpoint of FIG. 2, the axis line A may be an aggregate of the middle points of line segments each extending between a point on the inner peripheral surface of the first conductor 25A and a point where a normal at that point intersects the outer peripheral surface of the first conductor 25A. When a current flows through the first conductor 25A due to a potential difference applied between terminal electrodes, the current flows in the direction along the axis line A.

The first conductor 25A has a first portion 25A1 that extends from the first opening 10A1 on the mounting surface 10*b* toward the positive direction of the T axis, a second portion 25A2 that extends from the second opening 10A2 on the mounting surface 10*b* toward the positive direction of the T axis, a third portion 25A3 that connects an upper end of the first portion 25A1 and the upper end of the second portion 25A2, a protruding portion 25A4 that protrudes from a lower end of the first portion 25A1 toward the first end surface 10*c*, and a protruding portion 25A5 that protrudes from a lower end of the second portion 25A2 toward the second end surface 10*d*. The lower end of the first portion 25A1 and the lower end of the second portion 25A2 are exposed from the mounting surface 10*b* to the outside of the base body 10. The protruding portion 25A4 is exposed to the outside of the base body 10 from the mounting surface 10*b* and the first end surface 10*c*, and the protruding portion 25A5 is exposed to the outside of the base body 10 from the mounting surface 10*b* and the first end surface 10*d*. The protruding portion 25A4 is formed by bending the lower end of the first portion 25A1 in a direction toward the first end surface 10*c* (toward the outside of the base body 10), and the protruding portion 25A5 is formed by bending the lower end of the second portion 25A2 in a direction toward the second end surface 10*d* (toward the outside of the base body 10). Instead of bending the first conductor 25A, the protruding portions 25A4 and 25A5 may be formed by grinding a portion of the first conductor 25A. The method of forming the protruding portions 25A4 and 25A5 is not limited to those illustrated herein. As mentioned above, the first conductor 25A is exposed to the outside of the base body 10 through at least the first opening 10A1 at one end thereof, and is exposed to the outside of the base body 10 through at least the second opening 10A2 at the other end thereof. The first conductor 25A is curved around a boundary between the first portion 25A1 and the third portion 25A3 and a boundary between the second portion 25A2 and the third portion 25A3. In the illustrated embodiment, the first portion 25A1 faces the first end surface 10*c* and extends parallel to this first end surface 10*c*. The second portion 25A2 faces the second end surface 10*d* and extends parallel to this second end surface 10*d*. The third portion 25A3 extends parallel to the upper surface 10*a*.

The first conductor 25A is connected to the land 3*a* at the lower end of the first portion 25A1 and the protruding portion 25A4, and to the land 3*b* at the lower end of the second portion 25A2 and the protruding portion 25A5. Thus, the portion around the lower end of the first portion 25A1 and the protruding portion 25A4 form one terminal electrode of the first conductor 25A, and the portion around the lower end of the second portion 25A2 and the protruding portion 25A5 form the other terminal electrode of the first conductor 25A. The protruding portion 25A4 and the protruding portion 25A5 may not be necessarily provided. When the protruding portion 25A4 and the protruding portion 25A5 are not provided, the first conductor 25A is connected to the land 3*a* at the lower end of the first portion 25A1 and to the land 3*b* at the lower end of the second portion 25A2.

The second conductor 25B is arranged such that it faces the outer surface 11*c*1 of the raised portion 11*c* and the outer surface 12*c*1 of the raised portion 12*c* that define the through-hole 10A. Thus, the second conductor 25B is arranged such that it opposes the first conductor 25A at a position spaced away from the first conductor 25A in the through-hole 10A toward the inside of the base body 10. As described above, in the magnetic coupling coil component 1, the first conductor 25A and the second conductor 25B are aligned in the direction from the inside to the outside of the base body 10. Therefore it is possible to reduce the external dimension of the magnetic coupling coil component 1 in the direction along the mounting surface 10*b* compared to conventional magnetic coupling coil components in which the magnetically coupled conductors are aligned in the direction along the mounting surface 10*b*.

The second conductor 25B extends along an axis line B that extends in the through-hole 10A from the first opening 10A1 to the second opening 10A2. The axis line B extends in the through-hole 10A in a direction parallel to the axis line A. When viewed from the viewpoint of FIG. 2, the axis line B may be an aggregate of the middle points of line segments each extending between a point on the inner peripheral surface of the second conductor 25B and a point where a normal at that point intersects the outer peripheral surface of the second conductor 25B. When a current flows through the second conductor 25B due to a potential difference applied between terminal electrodes, the current flows in the direction along the axis line B.

The second conductor 25B has a first portion 25B1 that extends from the first opening 10A1 on the mounting surface 10*b* toward the positive direction of the T axis, a second portion 25B2 that extends from the second opening 10A2 on the mounting surface 10*b* toward the positive direction of the T axis, a third portion 25B3 that connects an upper end of the first portion 25B1 and the upper end of the second portion 25B2, a protruding portion 25B4 that protrudes from a lower end of the first portion 25B1 toward the first end surface 10*c* (or toward the second end surface 10*d*), and a protruding portion 25B5 that protrudes from a lower end of the second portion 25B2 toward the second end surface 10*d* (or toward the first end surface 10*c*). The lower end of the first portion 25B1, the lower end of the second portion 25B2, the protruding portion 25B4, and the protruding portion 25B5 are exposed from the mounting surface 10*b* to the outside of the base body 10. The protruding portion 25B4 is formed by bending the lower end of the first portion 25B1 in a direction away from the first end surface 10*c* (toward the inside of the base body 10), and the protruding portion 25B5 is formed by bending the lower end of the second portion 25B2 in a direction away from the second end surface 10*d* (toward the inside of the base body 10). Instead of bending the second conductor 25B, the protruding portions 25B4 and 25B5 may be formed by grinding a portion of the second conductor 25B. The terminal electrodes 25B4 and 25B5 may not necessarily have a curved shape. As mentioned above, the second conductor 25B is exposed to the outside of the base body 10 through at least the first opening 10A1 at one end thereof, and is exposed to the outside of the base body 10 through at least the second opening 10A2 at the other end thereof. The second conductor 25B is curved around a boundary between the first portion 25B1 and the third portion 25B3 and a boundary between the second portion 25B2 and the third portion 25B3. In the illustrated embodiment, the first portion 25B1, the second portion 25B2, and the third portion 25B3 of the second conductor 25B oppose the first portion 25A1, the second portion 25A2, and the third portion 25A3 of the first conductor 25A, respectively. The first portion 25B1, the second portion 25B2, and the third portion 25B3 of the second conductor 25B extend parallel to the first portion 25A1, the second portion 25A2, and the third portion 25A3 of the first conductor 25A, respectively.

The second conductor 25B is connected to the land 3*c* at the lower end of the first portion 25B1 and the protruding portion 25B4, and to the land 3*d* at the lower end of the second portion 25B2 and the protruding portion 25B5. Thus, the portion around the lower end of the first portion 25B1 and the protruding portion 25B4 form one terminal electrode of the second conductor 25B, and the portion around the lower end of the second portion 25B2 and the protruding portion 25B5 form the other terminal electrode of the second conductor 25B. The protruding portion 25B4 and the protruding portion 25B5 may not be necessarily provided. When the protruding portion 25B4 and the protruding portion 25B5 are not provided, the second conductor 25B is connected to the land 3*c* at the lower end of the first portion 25B1 and to the land 3*d* at the lower end of the second portion 25B2.

The base body 10 is divided into an upper region and a lower region by an intermediate surface C which is equidistant from the upper surface 10*a* and the mounting surface 10*b*. In FIG. 2, reference "T1" denotes a distance between the upper surface 10*a* and the mounting surface 10*b*. In the illustrated embodiment, the third portion 25A3 of the first conductor 25A is situated in the upper region of the base body 10. This allows the total length of the first conductor 25A to be longer compared to the case where the third portion 25A3 of the first conductor 25A is disposed in the lower region, thereby increasing the self-inductance of the first conductor 25A. In addition, Joule heat generated in the first conductor 25A can be efficiently dissipated from the upper surface 10*a* of the base body 10. In the illustrated embodiment, the third portion 25B3 of the second conductor 25B is also situated in the upper region of the base body 10. This allows the total length of the second conductor 25B to be longer, thereby increasing the self-inductance of the second conductor 25B. In addition, Joule heat generated in the second conductor 25B can be efficiently dissipated from the upper surface 10*a* of the base body 10. By increasing the self-inductance of the first and second conductors 25A, 25B, the coupling coefficient of the coil component 1 can be increased.

Both the first conductor 25A and the second conductor 25B are wound around the inner core of the base body 10 (a portion of the base body 10 where the raised portion 11*c* of the first member 11 and the raised portion 12*c* of the second member 12 are joined) for less than one turn. In a plan view viewed from the positive direction of the T axis, the first conductor 25A extends linearly from the protruding portion 25A4 to the protruding portion 25A5, and the second conductor 25B extends linearly from the protruding portion 25B4 to the protruding portion 25B5. Thus, both the first conductor 25A and the second conductor 25B do not have a turned region (turn) in plan view.

As mentioned above, the non-magnetic portion 30 is provided between the first conductor 25A and the second conductor 25B. The non-magnetic portion 30 is formed of a non-magnetic material with a high insulation property. The relative magnetic permeability of the non-magnetic portion 30 may be lower than that of the base body 10 in order to reduce the magnetic flux passing between the first conductor 25A and the second conductor 25B. Examples of the non-magnetic material used for the non-magnetic portion 30 include various resin materials (for example, a polyimide resin, an epoxy resin, and other resin materials), various dielectric ceramics (borosilicate glass, a mixture of borosilicate glass and crystalline silica, and other dielectric ceramics), various metal-oxides (for example, alumina), non-magnetic ferrite materials (for example, Zn—Cu-based ferrite), and any other known non-magnetic materials with a high insulation property. The non-magnetic portion 30 may be a void space. The relative magnetic permeability of the non-magnetic portion 30 may be in the range of 1 to 15, 1 to 10, or 1 to 5, for example. In one embodiment of the invention, the relative magnetic permeability of the non-magnetic portion 30 is less than one-tenth of the relative magnetic permeability of the base body 10. The non-magnetic portion 30 may include two or more portions made of different non-magnetic materials from each other. For example, a part of the non-magnetic portion 30 may be formed of a resin material and the remaining part may be formed of a dielectric ceramic. Alternatively, a part of the non-magnetic portion 30 may be a void space and the remaining part may be formed of a non-magnetic material. As previously described, at least one of the first conductor 25A or the second conductor 25B may have on its surface the Ni plating layer containing Ni, the Sn plating layer containing Sn, and/or the insulating film formed of an insulating material. In the case where a member having a different magnetic permeability from that of the base body 10 is disposed between the first conductor 25A and the second conductor 25B, this member having the different magnetic permeability also constitutes a part of the non-magnetic portion 30. Thus, the non-magnetic portion 30 may include two or more regions that have different relative magnetic permeabilities from each other. When the non-magnetic portion 30 includes the two or more regions having different relative magnetic permeabilities from each other, the "relative magnetic permeability of the non-magnetic portion 30" does not refer to the individual relative magnetic permeabilities of the regions having the different relative magnetic permeability, but rather an overall relative magnetic permeability of the entire non-magnetic portion 30. The first conductor 25A and/or the second conductor 25B may be fixed to the base body 10 with an adhesive. In addition, a non-magnetic member such as an adhesive or a spacer made of a non-magnetic material may be provided between the first conductor 25A and the second conductor 25B in order to maintain a space between the first conductor 25A and the second conductor 25B. When the adhesive or non-magnetic material is provided between the first conductor 25A and the second conductor 25B, the adhesive or non-magnetic material also constitutes a part of the non-magnetic portion 30. The adhesive may be provided over the entire region between the first conductor 25A and the second conductor 25B, or provided only in a portion of the region between the first conductor 25A and the second conductor 25B.

In one embodiment of the invention, the thickness of the non-magnetic portion 30 (i.e., the distance in the reference direction between the first conductor 25A and the second conductor 25B) may be 500 μm or less. By making the non-magnetic portion 30 thinner, the magnetic flux passing through this non-magnetic portion 30 can be further reduced.

Figure 5:
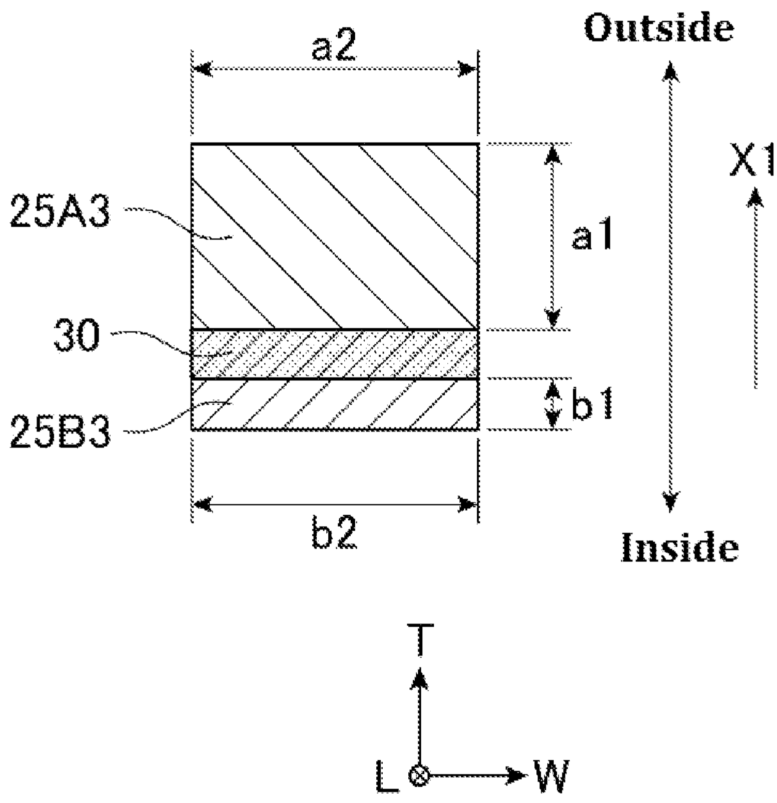
FIG. 5 is a sectional view of the magnetic coupling coil component of FIG. 1 along the line II-II of FIG. 2.
Figure 6:
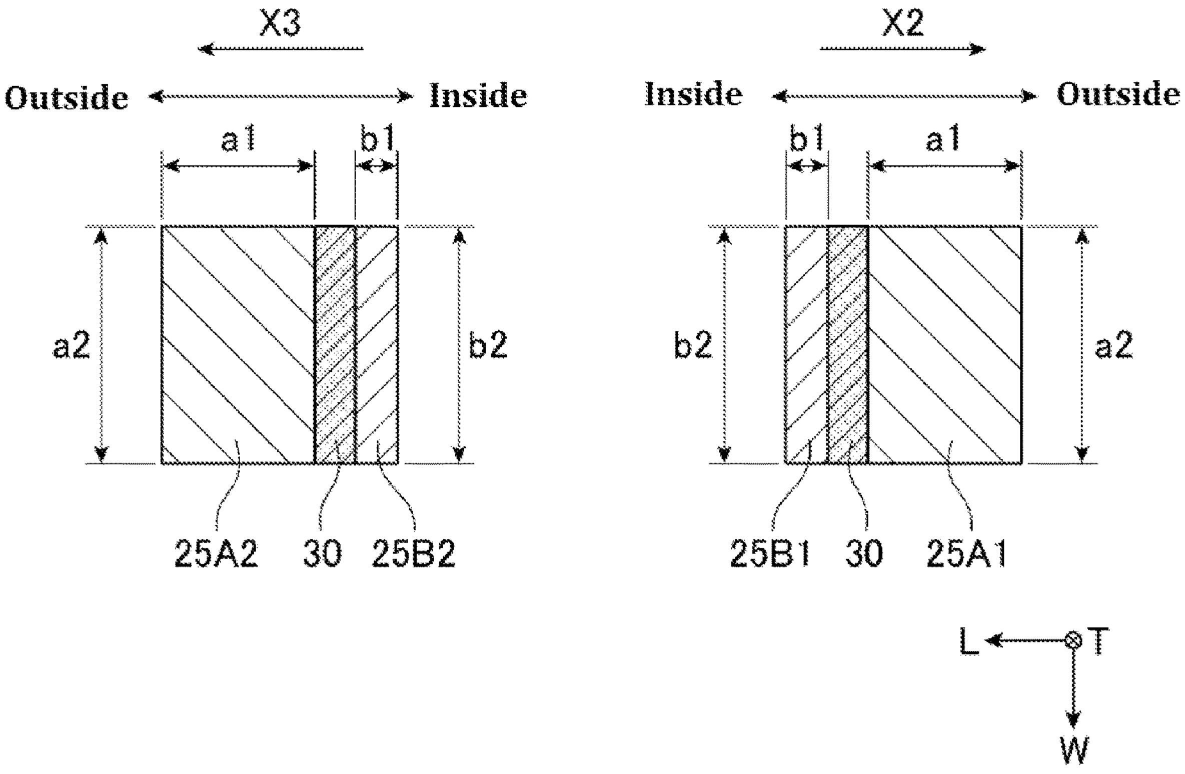
FIG. 6 is a sectional view of the magnetic coupling coil component of FIG. 1 along the line II-II of FIG. 2.

With further reference to FIGS. 5 and 6, the shapes and arrangements of the first conductor 25A and the second conductor 25B will be further described. FIG. 5 is a sectional view of the coil component 1 cut in a plane passing through the II-II line of FIG. 2, and FIG. 6 is a sectional view of the coil component 1 cut in a plane passing through the III-III line of FIG. 2. The II-II line extends parallel to the T axis such that it penetrates through the third portion 25A3 of the first conductor 25A and the third portion 25B3 of the second conductor 25B, and the III-III line extends parallel to the L axis such that it penetrates the first portion 25A1 and the second portion 25A2 of the first conductor 25A and the first portion 25B1 and the second portion 25B2 of the second conductor 25B. Both the II-II line and the III-III line are orthogonal to the axis line A. As described above, the current flows through the first conductor 25A along the axis line A. Thus, FIG. 5 shows the sections of the third portion 25A3 and the third portion 25B3 cut in a plane perpendicular to the direction of current flowing through the first conductor 25A, and FIG. 6 shows the sections of the first portion 25A1, the second portion 25A2, the first portion 25B1, and the second portion 25B2 cut in a plane perpendicular to the direction of current flowing through the first conductor 25A. In FIGS. 5 and 6, illustrations of the components of the coil component 1 other than the first conductor 25A and the second conductor 25B are omitted for the sake of brevity of description.

As described above, the second conductor 25B is disposed at a position spaced away from the first conductor 25A toward the inside of the base body 10. In other words, the first conductor 25A is disposed at a position spaced away from the second conductor 25B toward the outside of the base body 10. The direction from the inside to the outside of the base body 10 in the sectional plane perpendicular to the direction of the current flowing through the first conductor 25A is herein referred to as a "reference direction". The reference direction is orthogonal to the direction of the current flowing through the first conductor 25A (i.e., the direction along the axis line A). The plane orthogonal to the direction of the current flowing through the first conductor 25A is herein referred to as a "reference plane". Accordingly, in the section at the reference plane, the first conductor 25A is spaced away from the second conductor 25B in the reference direction. As shown in FIG. 5, in the section cut along the plane passing through the II-II line, the positive direction of the T axis is the reference direction (reference direction X1). As shown in FIG. 6, in the section cut along a plane passing through the III-III line, the negative direction of the L axis is the reference direction (reference direction X2) for the first portion 25A1, and the positive direction of the L axis is the reference direction (reference direction X3) for the second portion 25A2.

The dimension, in the reference direction, of the section of the first conductor 25A cut along the reference plane is defined as a dimension a1, and the dimension of the section in the direction perpendicular to the reference direction is defined as a dimension a2. In addition, the ratio of a2 to a1 (a2/a1) is defined as a first aspect ratio. Similarly, the dimension, in the reference direction, of the section of the second conductor 25B cut along the reference plane is defined as a dimension b1, and the dimension of the section in the direction perpendicular to the reference direction is defined as a dimension b2. In addition, the ratio of b2 to b1 (b2/b1) is defined as a second aspect ratio. In the embodiment shown in FIGS. 5 and 6, the dimension a1 of the section of the first conductor 25A in the reference direction is smaller than the dimension a2 of that section in the direction perpendicular to the reference direction. Accordingly, the first aspect ratio is greater than one. Similarly, the dimension b1 of the section of the second conductor 25B in the reference direction is smaller than the dimension b2 of that section in the direction perpendicular to the reference direction. Accordingly, the second aspect ratio is greater than one.

In one or more embodiments of the invention, the dimension a2, in the direction perpendicular to the reference direction, of the section of the first conductor 25A cut along the reference plane is equal to, or substantially equal to, the dimension b2, in the direction perpendicular to the reference direction, of the section of the second conductor 25B cut along the reference plane. In one embodiment of the invention, the ratio of the dimension a2 to the dimension b2 (a2/b2) is in the range of 0.8 to 1.2. As described above, the second conductor 25B is disposed such that it faces the first conductor 25A. In one embodiment of the invention, the second conductor 25B is considered to face the first conductor 25A when the section of the first conductor 25A cut along the reference plane and the section of the second conductor 25B cut along the reference plane are projected in the reference direction, and 80% or more of the area of the projected image of the second conductor 25B overlaps the projected image of the first conductor 25A.

In the embodiment shown in FIGS. 5 and 6, the area of the section of the first conductor 25A cut along the reference plane is larger than the area of the section of the second conductor 25B cut along the reference plane. This allows a larger current to flow through the first conductor 25A than a current flowing through the second conductor 25B. In the case where the sectional area of the first conductor 25A is not constant, the average of the sectional areas of the first conductor 25A at sections passing through three points located at equal intervals on the axis line A can be used as the sectional area of the first conductor 25A. The same applies to the sectional area of the second conductor 25B.

In the embodiment shown in FIGS. 5 and 6, the dimension b1, in the reference direction, of the section of the second conductor 25*b* cut along the reference plane is smaller than the dimension a1, in the reference direction, of the section of the first conductor 25A cut along the reference plane. For example, the dimension b1 is in the range of 10% to 50% of the dimension a1. Since the second conductor 25B is situated on the inner side of the base body 10 than the first conductor 25A, the length of the second conductor 25B along the axis line B is shorter than the length of the first conductor 25A along the axis line A. Therefore, if all conditions other than the length along the axis are the same, the self-inductance of the second conductor 25B will be smaller than that of the first conductor 25A. By making the dimension b1 of the second conductor 25B smaller than the dimension a1 of the first conductor 25A, a difference between the length along the axis line A of the first conductor 25A and the length along the axis line B of the second conductor 25B can be made smaller than a difference of the length when the dimension b1 is about the same as the dimension a1. Therefore, by making the dimension b1 of the second conductor 25B smaller than the dimension a1 of the first conductor 25A, a difference of the self-inductance between the first conductor 25A and the second conductor 25B can be made smaller than a difference of the self-inductance when the dimension b1 is about the same as the dimension a1.

In the embodiments shown in FIGS. 5 and 6, the sections of the first and second conductors 25A and 25B along the reference plane are both rectangular in shape, but the shapes of the sections are not limited to rectangular. The shapes of the sections of the first and second conductors 25A, 25B along the reference plane may be ovals, ellipses, or any other shapes. When the shape of the sections of the first and second conductors 25A, 25B along the reference plane are not rectangular, the dimension a1 of the first conductor 25A in the reference direction means a dimension in the reference direction from one end to the other end of the section of the first conductor 25A cut along the reference plane. The same applies to the dimensions a2, b1, and b2.

Figure 9A:
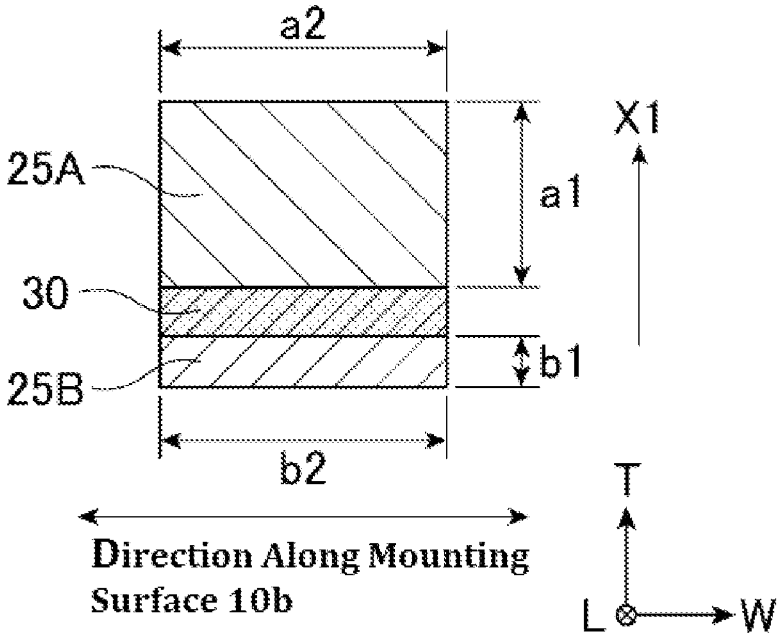
FIGS. 9A to 9C are schematic diagrams for comparing the magnetic coupling coil component according to one embodiment of the invention with a conventional magnetic coupling coil component.
Figure 9B:
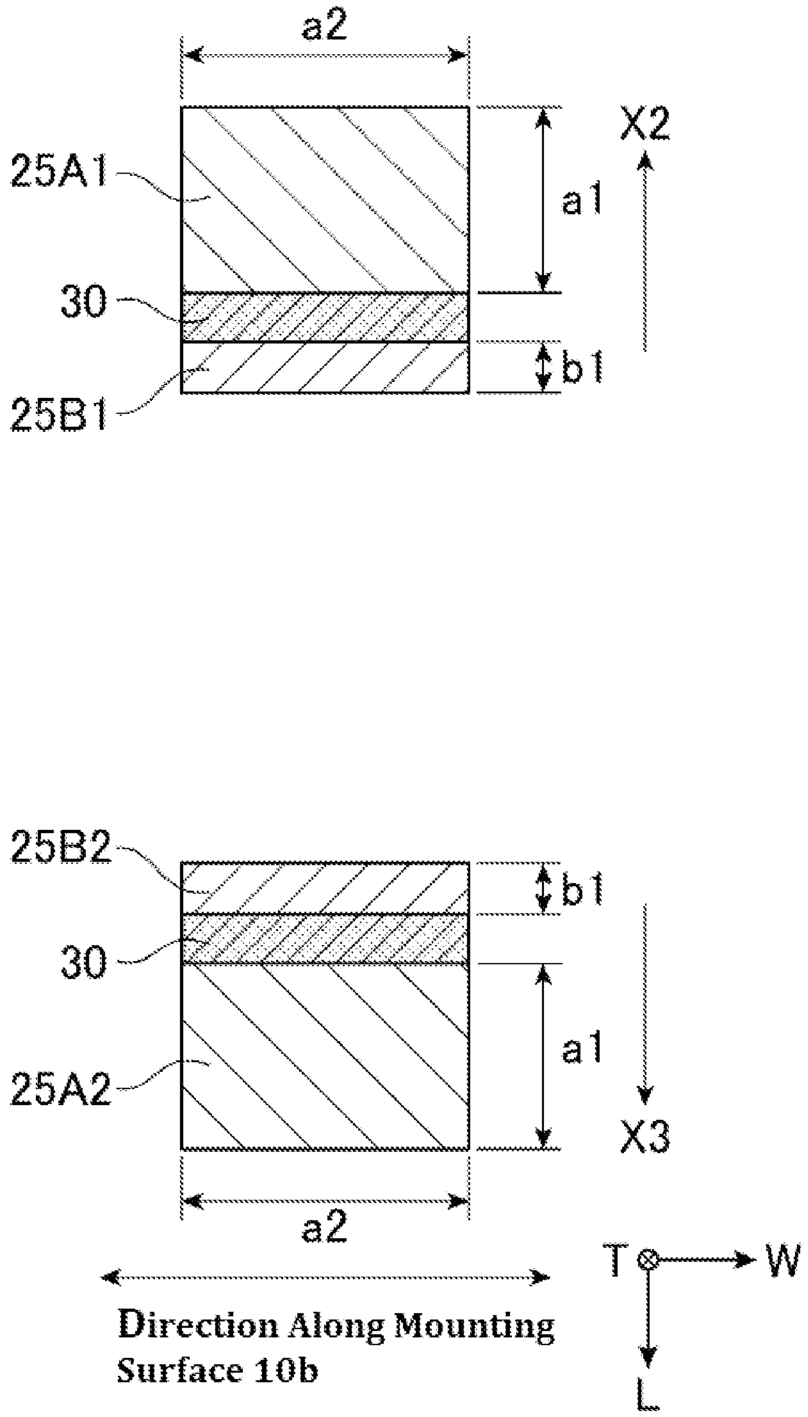
Figure 9C:
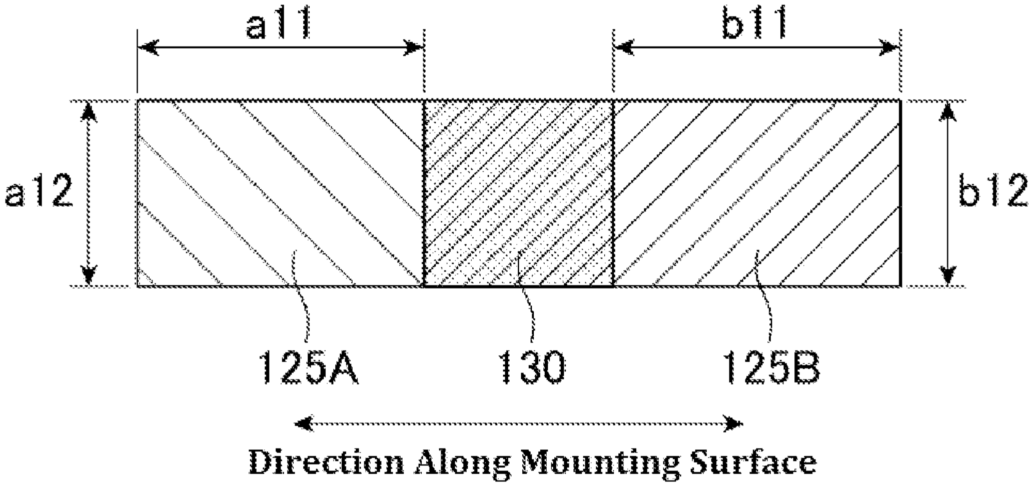
Prior Art Fig. 9C

Referring to FIGS. 9A to 9C and FIGS. 10A to 10C, magnetic coupling between the first conductor 25A and the second conductor 25B in the coil component 1 will be now described in comparison with magnetic coupling in a conventional coil component. FIG. 9A shows the same section of the coil component 1 as one shown in FIG. 5, and FIG. 9B shows the section of the coil component 1 of FIG. 6 rotated 90° counterclockwise. For comparison with FIGS. 9A and 9B, FIG. 9C shows a section of a conventional magnetic coupling coil component having magnetically coupled conductors 125A and 125B that are spaced apart from each other in a direction along a mounting surface. FIG. 9C shows a section cut along a plane perpendicular to the direction of current flowing through the conductor 125A. Thus, the sections shown in FIGS. 9A to 9C are the sections of the conductors cut along the plane orthogonal to the direction of current flowing through the conductors. In the following description referring to FIGS. 9A to 9C and FIGS. 10A to 10C, it is assumed that each of the conductors shown in these drawings is surrounded by a magnetic base body that contains metal magnetic particles and has a relative magnetic permeability of 30 to 60.

As shown in FIG. 9C, the conventional magnetic coupling coil component has the set of conductors 125A and 125B, and these conductors 125A and 125B are provided such that they face each other with a non-magnetic portion 130 interposed therebetween in the direction along the mounting surface. The conductors 125A and 125B are formed of the same material and function similarly as the first and second conductors 25A, 25B. However, the shapes and arrangements of the conductors 125A and 125B differ from those of the first and second conductors 25A, 25B. The non-magnetic portion 130 is formed of a non-magnetic material or is a void space (air), similar to the non-magnetic portion 30. As described above, except for a region where the conductors 125A and 125B contact the non-magnetic portion 130, they are surrounded by the magnetic base body that has the relative magnetic permeability in the range of 30 to 60. As described in the ’676 Publication and the ’758 Publication, in the conventional magnetic coupling coil component, the conductors 125A and 125B are configured and arranged such that the dimensions of the sides parallel to the mounting surface (a11, b11) are larger than the dimensions (a12, b12) of the sides orthogonal to the mounting surface (in particular, see paragraph of the ’758 Publication). Thus, in the conventional magnetic coupling coil component, the internal conductors 125A and 125B face each other on their narrower sides orthogonal to the mounting surface, instead of on their wider sides parallel to the mounting surface. Whereas in the coil component according to one or more embodiments of the invention, the first aspect ratio (a2/a1) is greater than one, and the first conductor 25A and the second conductor 25B face each other on their wider sides parallel to the mounting surface, as shown in FIGS. 9A and 9B.

Figure 10A:
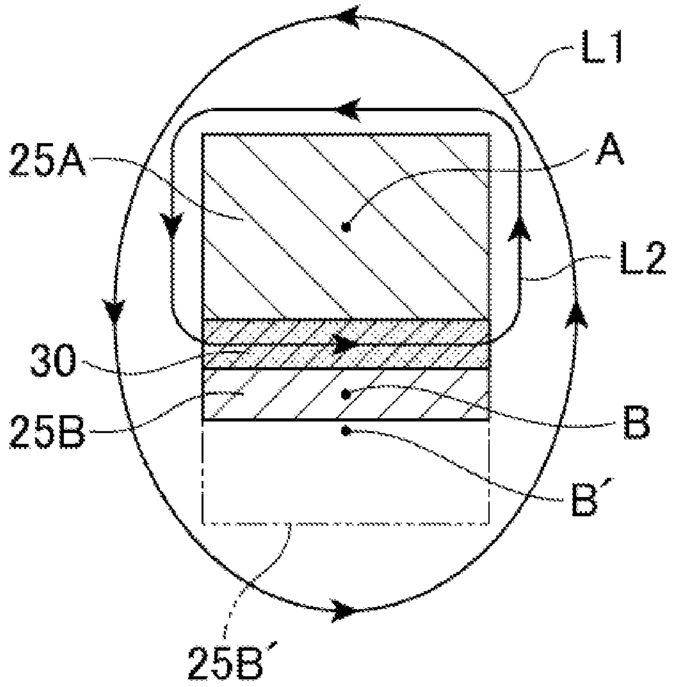
FIGS. 10A to 10C are schematic diagrams for comparing flows of a magnetic flux through and around the magnetic coupling coil component according to one embodiment of the invention with flows of a magnetic flux through and around the conventional magnetic coupling coil component.
Figure 10B:
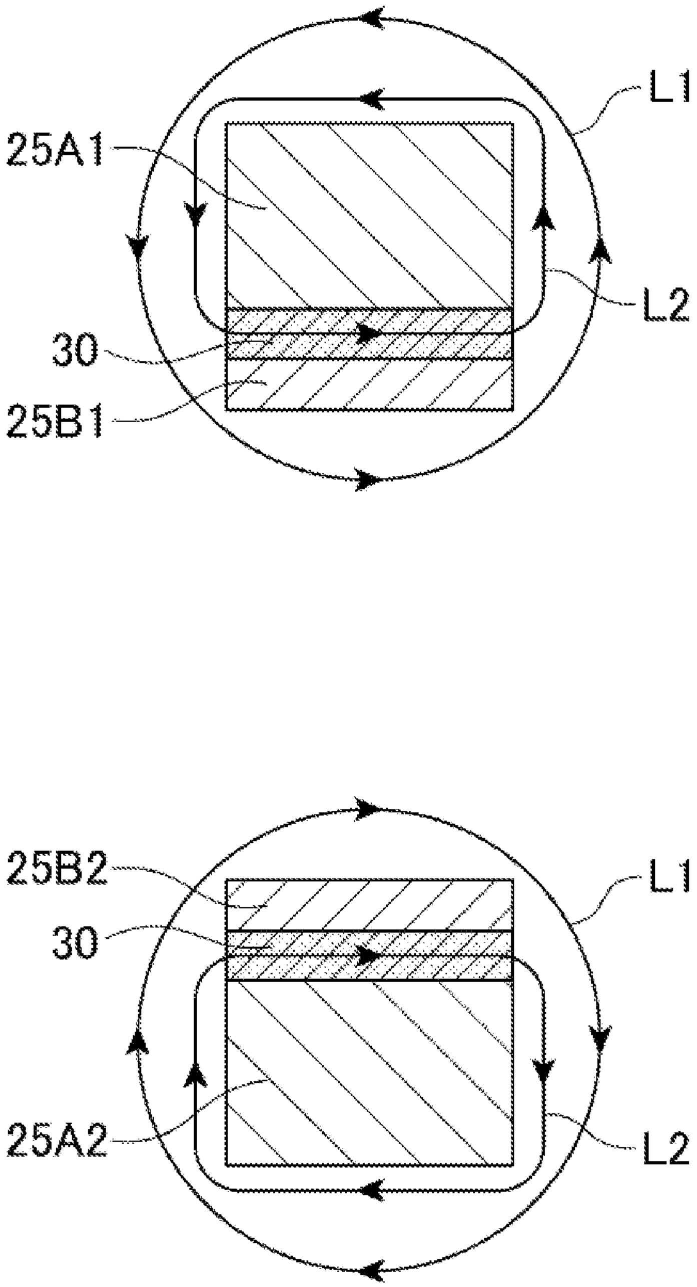
Figure 10C:
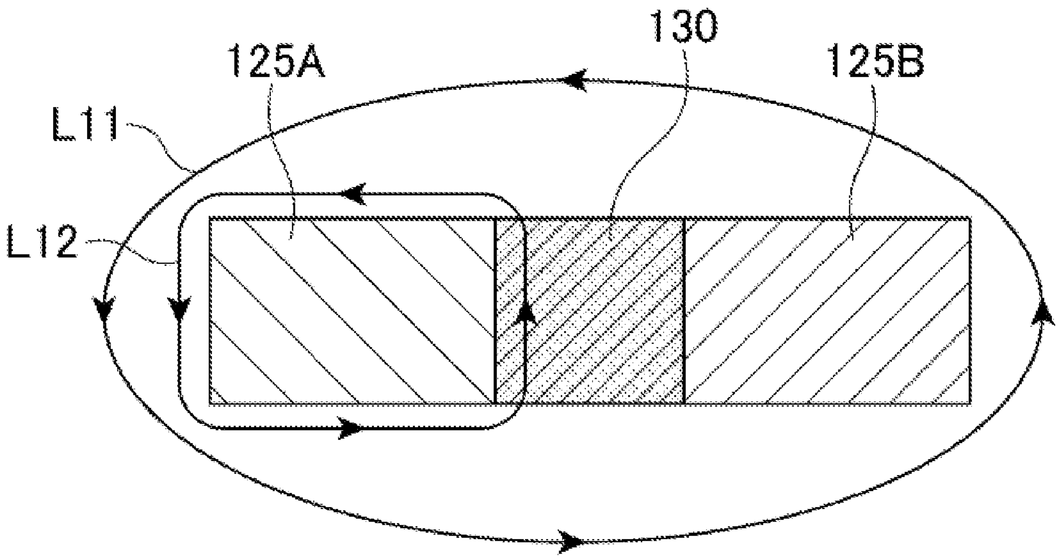
Prior Art Fig. 10C

As shown in FIGS. 10A and 10B, when current flowing through the first conductor 25A changes in the coil component 1, the magnetic field is generated around the first conductor 25A and paths of the magnetic flux include a first loop L1 that passes only through the magnetic base body without passing through the non-magnetic portion 30 and a second loop L2 that partially passes through the non-magnetic portion 30. The second loop may also pass through the second conductor 25B. Since the magnetic flux passing through the second loop L2 does not contribute to the magnetic coupling between the first conductor 25A and the second conductor 25B, the coupling coefficient between the first conductor 25A and the second conductor 25B can be increased by reducing the magnetic flux passing through the second loop L2. For the sake of brevity of explanation, illustration of the magnetic flux generated around the second conductor 25B when current flowing through the second conductor 25B is omitted. The length of a segment of the second loop L2 situated between the first conductor 25A and the second conductor 25B is substantially equal to a2 (b2). Since the non-magnetic portion 30 is provided in the region between the first conductor 25A and the second conductor 25B, the magnetic flux along the second loop L2 passes through the non-magnetic portion 30 partially in a length of approximately a2. As shown in FIG. 10C, when current flowing through the conductor 125A changes in the coil component 1, the magnetic field is generated around the conductor 125A and paths of the magnetic flux include a first loop L11 that passes only through the magnetic base body without passing through the non-magnetic portion 130 and a second loop L12 that partially passes through the non-magnetic portion 130. The second loop may also pass through the second conductor 125B. The length of a segment of the second loop L12 situated between the conductor 125A and the conductor 125B is substantially equal to the dimension a12 (b12). Since the non-magnetic portion 130 is provided in the region between the conductor 125A and the conductor 125B, the magnetic flux along the second loop L2 passes through the non-magnetic portion 130 partially in a length of approximately a12. Since the first aspect ratio (a12/a11) is smaller than one in the conventional magnetic coupling coil component, while the first aspect ratio (a2/a1) is larger than one in the magnetic coupling coil 1, the proportion of the non-magnetic portion 30 in the total length of the second loop L2 is larger than the proportion of the non-magnetic portion 130 in the total length of the second loop L12. Therefore, the magnetic flux along the second loop L2 in the magnetic coupling coil 1 according to one embodiment of the invention can be reduced compared to the magnetic flux along the second loop L12 in the conventional magnetic coupling coil component. As a result, the coupling coefficient between the first conductor 25A and the second conductor 25B can be increased compared to that of the conventional magnetic coupling coil component.

A difference in the self-inductance between the first conductor 25A and the second 25B conductor will be now described. In a magnetic coupling coil component having two or more conductor systems, it is desirable that the electrical characteristics of each system, especially the self-inductance, be the same or substantially the same. In conventional magnetic coupling coil components, as described in the ’676 Publication and the ’758 Publication and as shown in FIG. 10C, the conductors (e.g., the conductor 125A and the conductor 125B) have the same shape, so that the electrical characteristics of the conductors are also same. Whereas, in an embodiment of the invention, the first conductor 25A is situated on the outer side of the second conductor 25B so that the first conductor 25A and the second conductor 25B cannot have the same shape. Specifically, the length of the first conductor 25A along the axis line A is longer than the length of the second conductor 25B along the axis line B. Therefore, if all other conditions are the same, the self-inductance of the first conductor 25A will be larger than the self-inductance of the second conductor 25B. To address this, as shown in FIGS. 9A and 9B, the dimension b1 in the reference direction (W1, W2, W3 directions) of the section of the second conductor 25B cut along the reference plane is made smaller than the dimension a1 of the section of the first conductor 25A in the reference direction. In this way, it is possible to reduce the difference between the length of the first conductor 25A in the direction of current flowing through the first conductor 25A (length of the axis line A) and the length of the second conductor B along the direction of current flowing through the second conductor 25B (length of the axis line B). The section of a hypothetical second conductor 25B' having the same sectional shape as the first conductor 25A is indicated by a virtual line in FIG. 10A. The dimension, in the reference direction, of the section of the hypothetical second conductor 25B' cut along the reference plane is assumed to be equal to the dimension a1. As illustrated, an axis line B' of the hypothetical second conductor 25B' that has the same sectional shape as the first conductor 25A is located farther from the axis line A than the axis line B of the second conductor 25B of the coil component 1. In one embodiment of the invention, by making the dimension b1, in the reference direction, of the section of the second conductor 25B cut along the reference plane smaller than the dimension a1, in the reference direction, of the section of the first conductor 25A cut along the reference plane, the axis line B of the second conductor 25B is placed closer to the axis line A of the first conductor 25A compared to the case where the two conductors that are magnetically coupled to each other have the same sectional shape. This makes it possible to reduce the difference between the length of the first conductor 25A along the axis A and the length of the second conductor 25B along the axis B compared to the case where the shapes of the two magnetically coupled conductors are the same. As a result, the difference in the self-inductance between the first conductor 25A and the second conductor 25B can be made smaller.

In the above description, it was assumed that each of the conductors shown in FIGS. 9A to 9C and FIGS. 10A to 10C is surrounded by the magnetic base body whose relative magnetic permeability is in the range of 30 to 60. As mentioned above, in one or more embodiments of the invention, the relative magnetic permeability of the base body 10 is not limited to the range of 30 to 60 (both inclusive). When the base body 10 has a higher relative magnetic permeability, specifically when the base body 10 is formed of Mn—Zn ferrite and has a high relative magnetic permeability of about 5000, the magnetic flux along the first loop can be increased by reducing the magnetic flux along the second loop L2, thereby the coupling coefficient between the first conductor 25A and the second conductor 25B can be made higher.

Except the area where the first conductor 25A and the second conductors 25A are in contact with the non-magnetic portion 30, they are surrounded by the magnetic base body whose relative magnetic permeability is in the range of 30 to 100. Therefore the magnitude of the self-inductance of the first conductor 25A and the self-inductance of the second conductor 25B can be controlled. The magnetic flux along the second loop can be controlled by the proportions of the first conductor 25A and the second conductor 25B. For example, when the proportion of the first conductor 25A is increased, the magnetic flux along the second loop is reduced and the self-inductance of the first conductor 25A is reduced. Whereas when the proportion of the first conductor 25A is decreased, the magnetic flux along the second loop is increased and the self-inductance of the first conductor 25A is increased. The inductance of the second conductor 25B can be changed in the same way. In other words, just by adjusting the first conductor 25A and the second conductor 25B, the difference in the self-inductance between the first conductor 25A and the second conductor 25B can be reduced or increased while maintaining their high coupling coefficient.

Simulations conducted by the inventor indicated that the coupling coefficient is improved by having the wider side of the first conductor 25A and the wider side of the second conductor 25B face each other when the relative magnetic permeability of the magnetic base body surrounding the conductors is 100 times or less than the relative magnetic permeability of the nonmagnetic portion 30 or 130. However, when the magnetic base body surrounding the conductors has a high relative magnetic permeability that exceeds 100 times the relative magnetic permeability of the nonmagnetic portion 30 or 130 (for example, when the magnetic base body is made of a material having a high relative magnetic permeability of about 5,000, such as Mn—Zn ferrite), the coupling coefficient is not improved by having the wider side of the first conductor 25A and the wider side of the second conductor 25B face each other.

For DC-DC converters and other applications, there is a demand for magnetic coupling coil components that allow a large current to run therethrough while keeping the coil components small in their external dimensions. The magnetic base body containing metal magnetic particles made of a soft magnetic metal material that has a high saturation magnetic flux density is adequate for the base body of coil components because magnetic saturation does not occur easily even when a large current flows through the conductors. When the present invention is applied to a magnetic coupling coil component that includes a magnetic base body containing metallic magnetic particles, the coupling coefficient is improved and the dimensions of the magnetic coupling coil component in the direction parallel to the mounting surface can be reduced.

Figure 11:
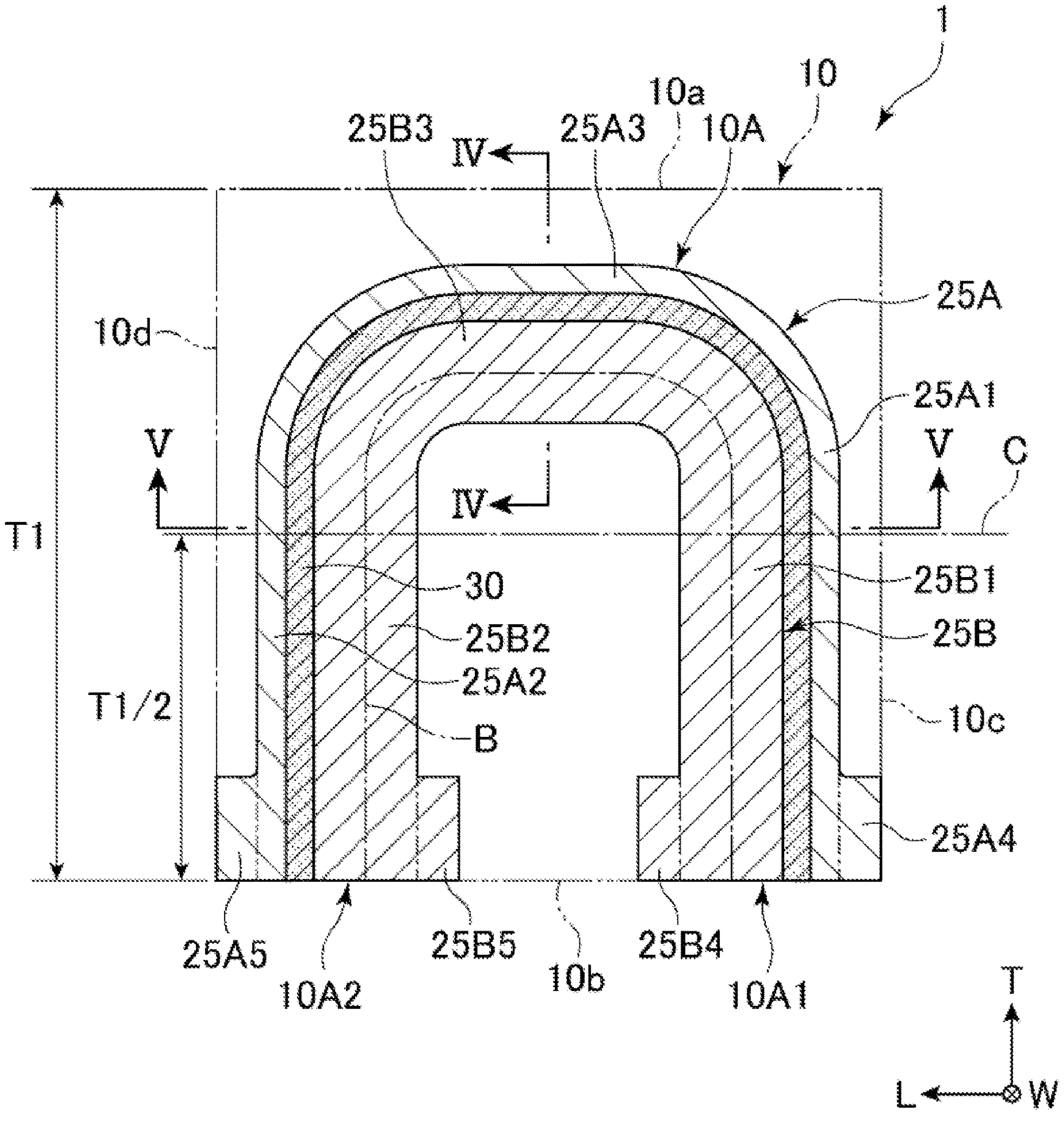
FIG. 11 is a sectional view of a magnetic coupling coil component according to another embodiment of the invention.
Figure 12:
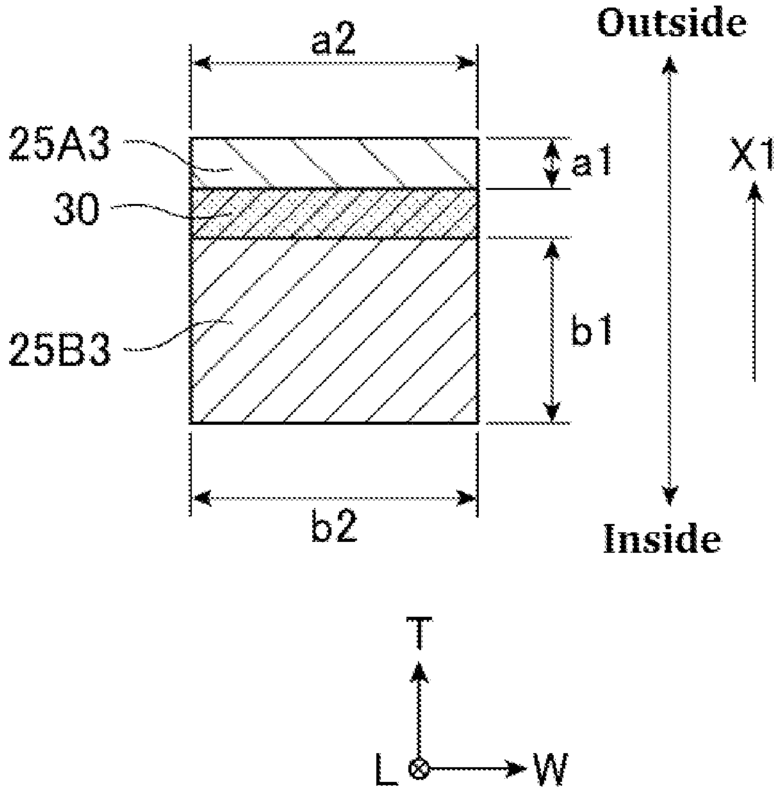
FIG. 12 is a sectional view of the magnetic coupling coil component of FIG. 11 along the line IV-IV of FIG. 11.
Figure 13:
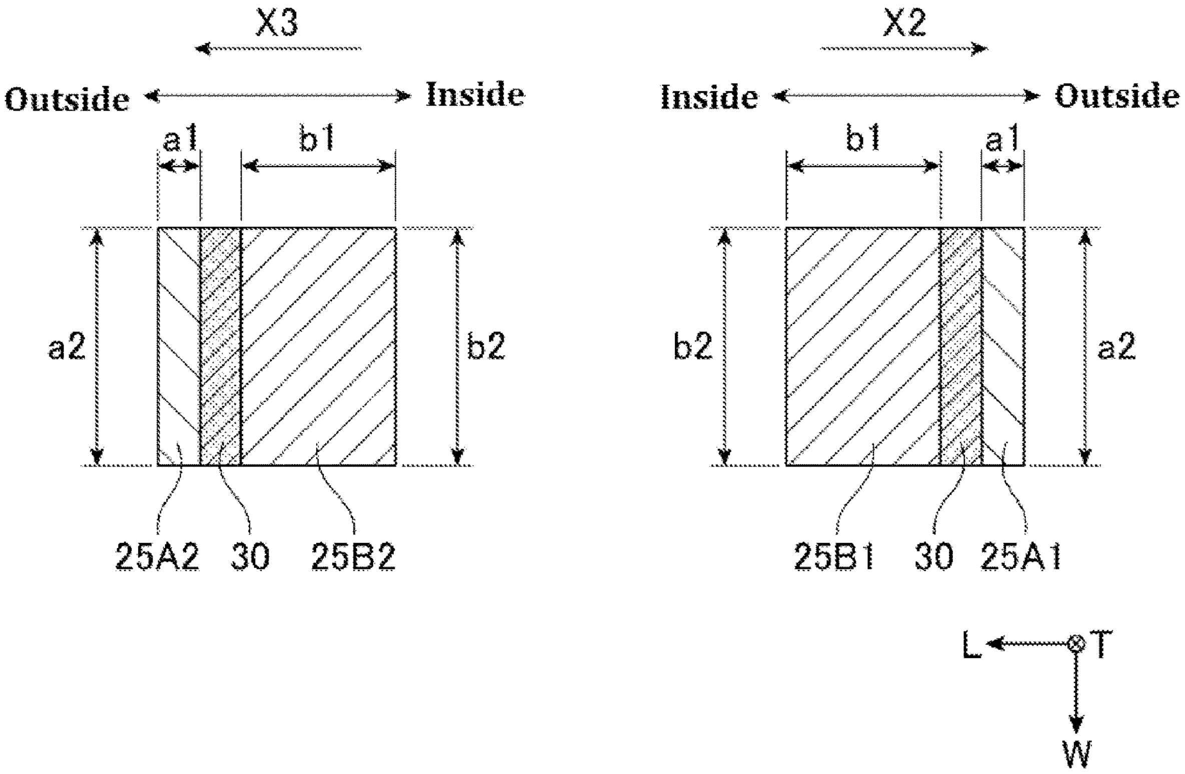
FIG. 13 is a sectional view of the magnetic coupling coil component of FIG. 11 along the line V-V of FIG. 11.

Another embodiment of the invention will be described with reference to FIGS. 11 to 13. FIG. 11 is a I-I sectional view of a magnetic coupling coil component according to another embodiment of the invention, FIG. 12 is a sectional view of the magnetic coupling coil component of FIG. 11 along the line Iv-Iv of FIG. 11, and FIG. 13 is a sectional view of the magnetic coupling coil component of FIG. 11 along the line v-v of FIG. 11. The embodiment shown in FIGS. 11 to 13 differs from the embodiment shown in FIGS. 1 to 6 in that the dimension b1, in the reference direction, of the section of the second conductor 25B cut along the reference plane is larger than the dimension a1 of the section of the first conductor 25A in the reference direction.

In the embodiment illustrated in FIGS. 11 to 13, by making the dimension a1 of the section of the first conductor 25A cut along the reference plane in the reference direction smaller than the dimension b1 of the section of the second conductor 25B in the reference direction, the axis line A of the first conductor 25A is placed closer to the axis line B of the second conductor 25B compared to the case where the two conductors that are magnetically coupled to each other have the same sectional shape. This makes it possible to reduce the difference between the length of the first conductor 25A along the axis A and the length of the second conductor 25B along the axis B compared to the case where the shapes of the two magnetically coupled conductors are the same. As a result, the difference in the self-inductance between the first conductor 25A and the second conductor 25B can be made smaller.

In the illustrated embodiment, the dimension b2 in the direction perpendicular to the reference direction of the section of the second conductor 25B cut along the reference plane is the same as the dimension a2 of the section of the first conductor 25A in the direction perpendicular to the reference direction, so a sectional area of the section of the second conductor 25B cut along the reference plane is larger than a sectional area of the first conductor 25A cut along the reference plane. This allows a larger current to flow through the second conductor 25B than a current flowing through the first conductor 25A.

Figure 14:
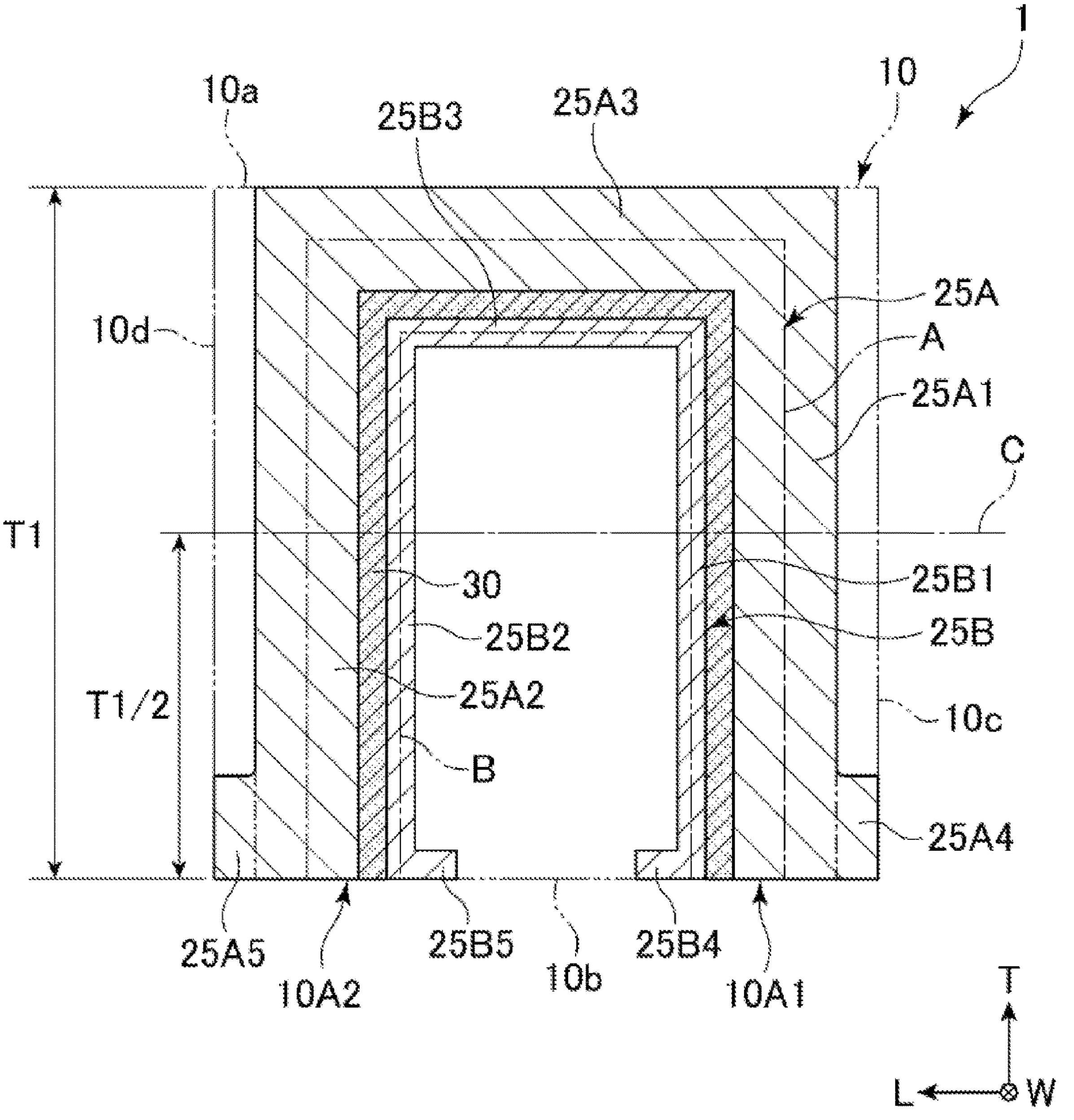
FIG. 14 is a sectional view of a magnetic coupling coil component according to yet another embodiment of the invention.
Figure 15:
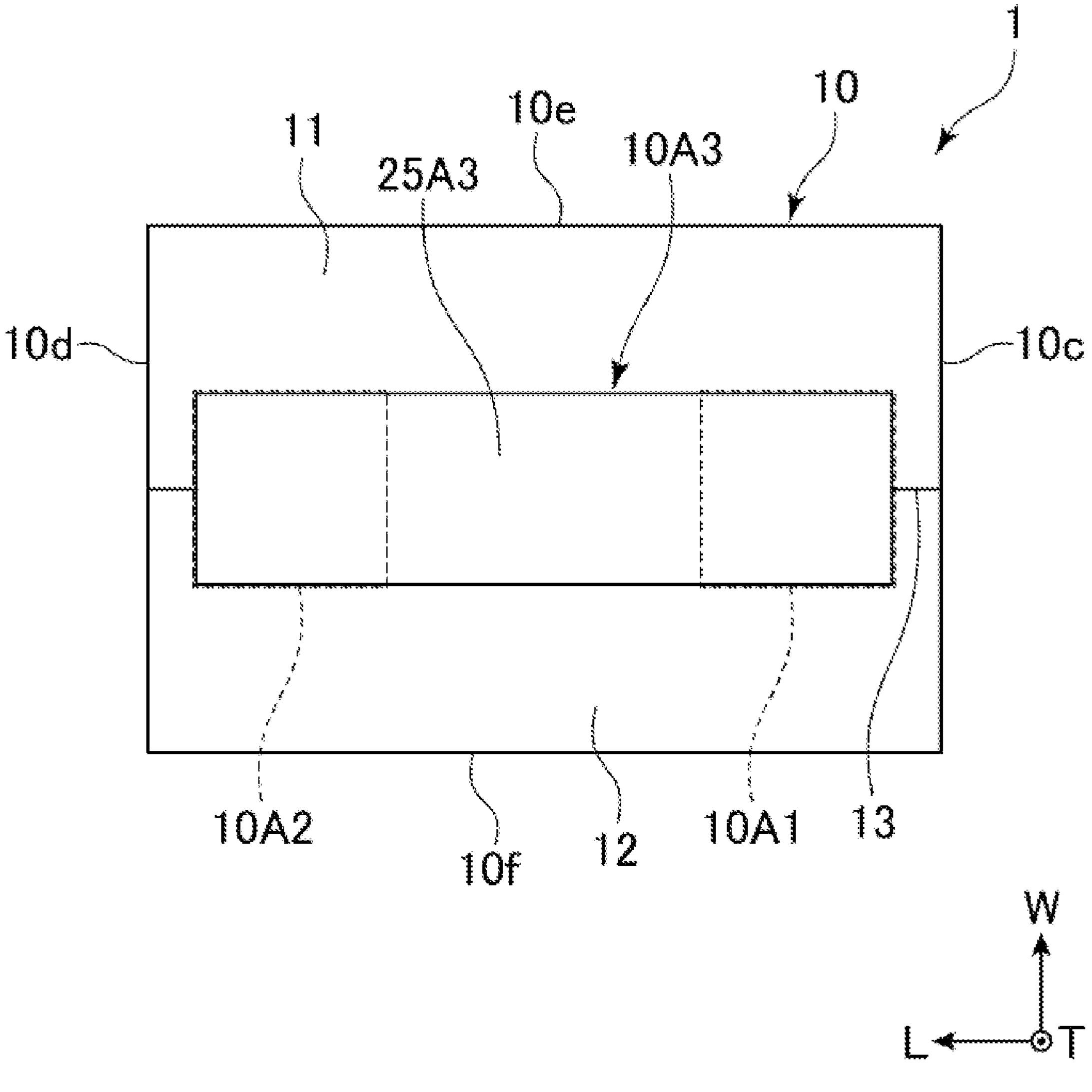
FIG. 15 is a top view of the magnetic coupling coil component of FIG. 14.

Next, yet another embodiment of the invention will be described with reference to FIGS. 14 and 15. FIG. 14 is a I-I sectional view of a magnetic coupling coil component according to still another embodiment of the invention, and FIG. 15 is a top view of the magnetic coupling coil component of FIG. 14. The embodiment shown in FIGS. 14 and 15 differ from the embodiment shown in FIGS. 1 to 6 in that an upper surface opening 10A3 is provided in the upper surface of the base body 10, and a part of the first conductor 25A is exposed to the outside of the base body 10 through this upper surface opening 10A3. As illustrated in the drawings, the upper surface opening 10A3 may be arranged such that its edge on the negative side of the L axis direction coincides with an edge of the first opening 10A1 on the negative side of the L axis direction in plan view (in the view point of FIG. 15), and its edge on the positive side of the L axis direction coincides with an edge of the second opening 10A2 on the positive side of the L axis direction in the plan view.

According to the embodiment shown in FIGS. 14 and 15, the dimensions of the first conductor 25A and the second conductor 25B in the direction perpendicular to the mounting surface (direction along the T axis) can be increased without changing the external shape of the base body 10, compared to the embodiment shown in FIGS. 1 to 6. As a result, according to the embodiments shown in FIGS. 14 and 15, the self-inductance of the first conductor 25A and the second conductor 25B can be increased compared to the embodiments shown in FIGS. 1 to 6, thereby increasing the coupling coefficient.

According to the embodiments shown in FIGS. 14 and 15, the upper surface opening 10A3 is arranged such that its edge on the negative side of the L axis direction coincides with an edge of the first opening 10A1 on the negative side of the L axis direction in plan view (in the view point of FIG. 15), and its edge on the positive side of the L axis direction coincides with an edge of the second opening 10A2 on the positive side of the L axis direction in the plan view. Therefore, the base body can be integrally formed using a molding die. This eliminates the need to bond the two members (first member 11 and second member 12) and thereby the manufacturing process can be simplified compared to the embodiment shown in FIGS. 7 and 8. In addition, according to the embodiment shown in FIGS. 14 and 15, the base body 10 is fabricated without the magnetic gap because the base body 10 is fabricated from magnetic material as a one-piece member. This configuration can further enhance the self-inductances of the first conductor 25A and the second conductor 25B. In the embodiment shown in FIGS. 14 and 15, a magnetic gap may be provided in a part of the base body 10 if necessary.

Figure 16:
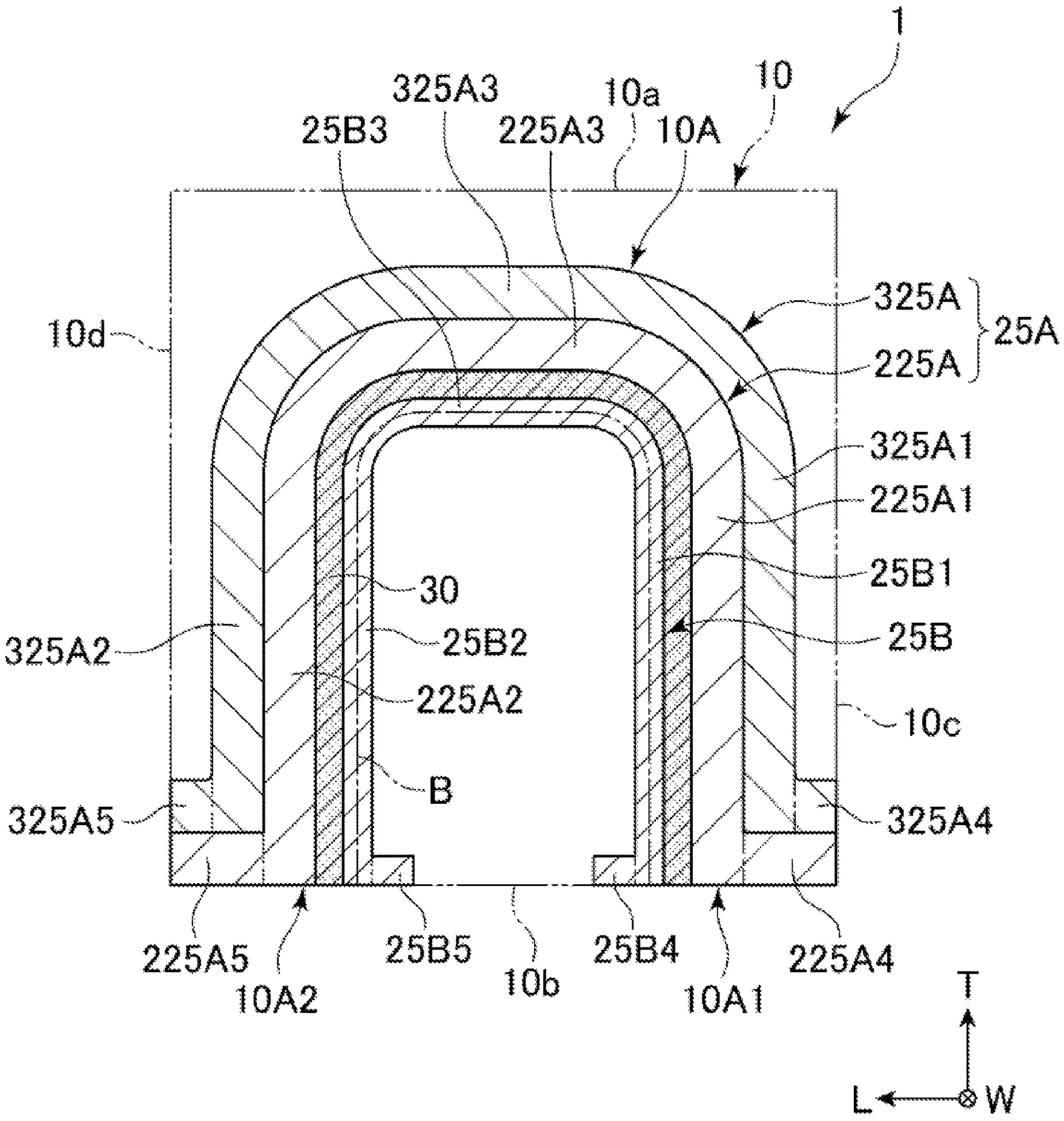
FIG. 16 is a sectional view of a magnetic coupling coil component according to still yet another embodiment of the invention.

Still yet another embodiment of the invention will be described with reference to FIG. 16. FIG. 16 is a I-I sectional view of a magnetic coupling coil component according to still yet another embodiment of the invention. In the embodiment shown in FIG. 16, the first conductor 25A has a first unit conductor 225A and a second unit conductor 325A, which is provided on the outer side of the base body 10 than the first unit conductor 225A. The first unit conductor 225A and the second unit conductor 325A are each formed of a metal material such as Ag or Cu having a high conductivity and configured to have a shape corresponding to the through-hole 10A.

The first unit conductor 225A has a first portion 225A1 that extends from the first opening 10A1 on the mounting surface 10*b* toward the positive direction of the T axis, a second portion 225A2 that extends from the second opening 10A2 on the mounting surface 10*b* toward the positive direction of the T axis, a third portion 225A3 that connects an upper end of the first portion 225A1 and the upper end of the second portion 225A2, a protruding portion 225A4 that protrudes from a lower end of the first portion 225A1 toward the first end surface 10*c*, and a protruding portion 225A5 that protrudes from a lower end of the second portion 225A2 toward the second end surface 10*d*. The second unit conductor 325A has a first portion 325A1 that extends from an upper surface of the protruding portion 225A4 of the first unit conductor 225A toward the positive direction of the T axis, a second portion 325A2 that extends from an upper surface of the protruding portion 225A5 of the first unit conductor 225A toward the positive direction of the T axis, a third portion 325A3 that connects an upper end of the first portion 325A1 and the upper end of the second portion 325A2, a protruding portion 325A4 that protrudes from a lower end of the first portion 325A1 toward the first end surface 10*c*, and a protruding portion 325A5 that protrudes from a lower end of the second portion 325A2 toward the second end surface 10*d*. The protruding portions 225A4, 225A5, 325A4, and 325A5 are formed by bending or other methods in the same way as the protruding portions 25A4 and 25A5.

A lower edge of the first portion 225A1 and a lower edge of the second portion 225A2 of the first unit conductor 225A are exposed from the mounting surface 10*b* to the outside of the base body 10. The protruding portion 225A4 is exposed from the mounting surface 10*b* and the first end surface 10*c* to the outside of the base body 10. The protruding portion 225A5 is exposed from the mounting surface 10*b* and the first end surface 10*d* to the outside of the base body 10. The protruding portion 325A4 of the second unit conductor 325A is exposed from the first end surface 10*c* to the outside of the base body 10, and the protruding portion 325A5 is exposed from the first end surface 10*d* to the outside of the base body 10. Thus, the first unit conductor 225A is connected to the land 3*a* at the lower end of the first portion 225A1 and the protruding portion 225A4, and is connected to the land 3*b* at the lower end of the second portion 225A2 and the protruding portion 225A5. The second unit conductor 325A is connected to the land 3*c* at the protruding portion 325A4 and to the land 3*d* at the protruding portion 325A5. When the coil component 1 shown in FIG. 16 is mounted on the mounting substrate 2, a molten solder travels over the surface of the protruding portion 225A4 of the first unit conductor 225A and spreads out on the protruding portion 325A4 of the second unit conductor 325A. The molten solder also travels over the surface of the protruding portion 225A5 of the first unit conductor 225A and spreads out on the protruding portion 325A5 of the second unit conductor 325A. In order to facilitate the wetting and spreading of solder during mounting, it is desirable that each of the surfaces of the protruding portions 225A4, 225A5, 325A4, and 325A5 (exposed surfaces where the base body 10 is exposed) be provided with a Ni plating layer containing Ni and/or a Sn plating layer containing Sn.

The outer peripheral surface of the first unit conductor 225A may directly contact the inner peripheral surface of the second unit conductor 325A. Alternatively, air, resin, plating, or any other insulating material may be provided between the outer peripheral surface of the first unit conductor 225A and the inner peripheral surface of the second unit conductor 325A.

When an insulating material is not provided between the first unit conductor 225A and the second unit conductor 325A and the outer peripheral surface of the first unit conductor 225A directly contacts the inner peripheral surface of the second unit conductor 325A, the first unit conductor 225A and the second unit conductor 325A are electrically connected in the base body 10. Similar to the case where the first conductor 25A is formed of a single member, when viewed in the viewpoint of FIG. 16, the axis line A may be an aggregate of the middle points of line segments each extending between a point in the inner peripheral surface of the first conductor 25A and a point where a normal at that point intersects the outer peripheral surface of the first conductor 25A. When a current flows through the first conductor 25A due to a potential difference applied between terminal electrodes, the current flows in the direction along the axis line A.

When the insulating material is provided between the first unit conductor 225A and the second unit conductor 325A to electrically insulate the first unit conductor 225A from the second unit conductor 325A, the first conductor 25A includes, within the base body 10, the first unit conductor 225A and the second unit conductor 325A that is arranged in parallel with the first unit conductor 225A. In this case, the first unit conductor 225A and the second unit conductor 225B are electrically connected externally outside the base body 10. When a current flows through the first conductor 25A due to a potential difference applied between the terminal electrodes, the current flows along the respective axis lines (not shown) through each of the first unit conductor 225A and the second unit conductor 225B. The axis line of the first unit conductor 225A and the axis line of the second unit conductor 325A may be defined in the same way as the axis line of the first conductor 25A described above. When the first conductor 25A includes the first unit conductor 225A and the second unit conductor 325A, the axis line A of the first conductor 25A is equidistant from the axis line of the first unit conductor 225A and the axis line of the second unit conductor 325A. When a current flows in the first conductor 25A due to a potential difference applied between the terminal electrodes, the current is divided into the first unit conductor 225A and the second unit conductor 325B and flows in the direction along the axis A of the first conductor 25A.

According to the embodiment shown in FIG. 16, the first conductor 25A has a two-layer structure including the first unit conductor 225A and the second unit conductor 325A. Since the thicknesses of the first unit conductor 225A and the second unit conductor 325A are smaller than that of the first conductor 25A, it is easier to process the first unit conductor 225A and the second unit conductor 325A into a shape that corresponds to the shape of the through-hole 10A compared to the case where the first conductor 25A is fabricated as a one-piece member. The first conductor 25A may include three or more layers of unit conductors. The second conductor 25B may also include two or more layers of unit conductors in the same manner as the first conductor 25A. The first conductor 25A is illustrated in FIG. 16 such that it has the two-layer structure aligned in the reference direction. Alternatively, the first conductor 25A may have a two-layer structure aligned in the W direction of the base body 10.

Figure 17:
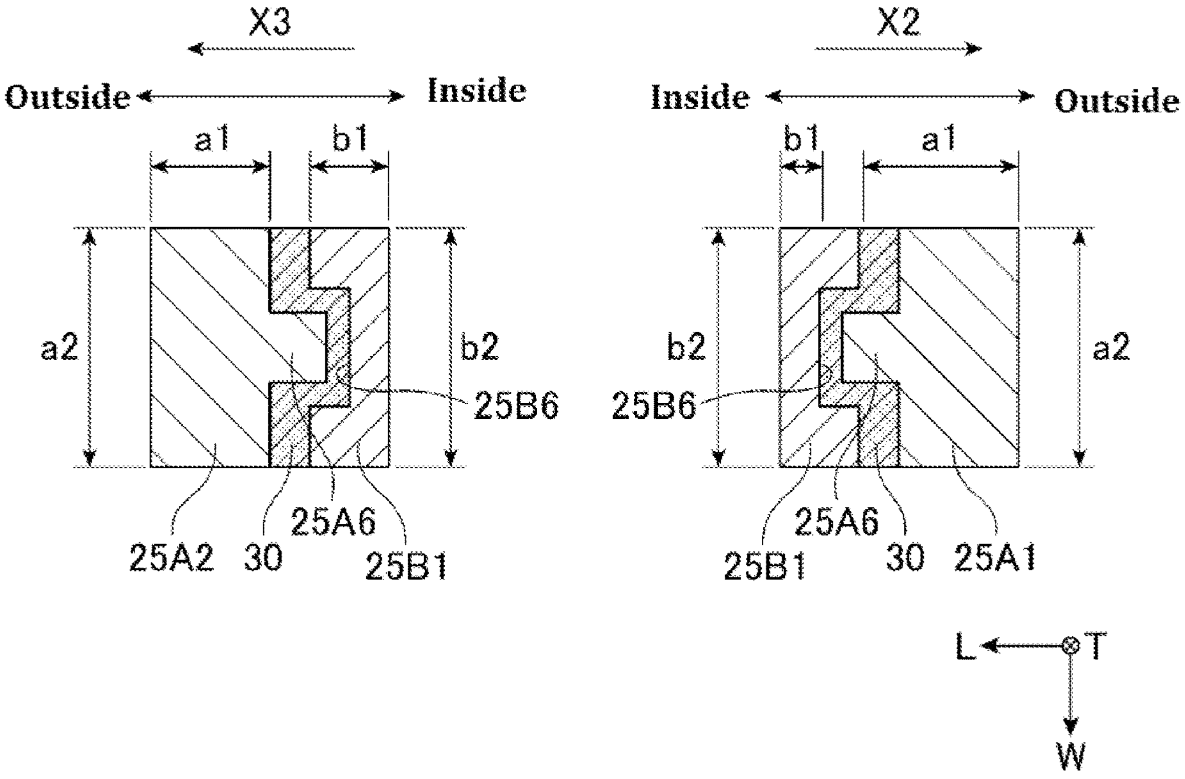
FIG. 17 is a sectional view of a magnetic coupling coil component according to another embodiment of the invention.

Another embodiment of the invention will be described with reference to FIG. 17. FIG. 17 is a III-III sectional view of a magnetic coupling coil component according to another embodiment of the invention. In the embodiment shown in FIG. 17, the sectional shapes of the first conductor 25A and the second conductor 25B cut along the reference plane are different from the sectional shapes of the first conductor 25A and the second conductor 25B of FIG. 6. Specifically, in the embodiment shown in FIG. 17, the first portion 25A1 and the second portion 25A2 of the first conductor 25A each have a convex portion 25A6 that protrudes toward the inside of the base body 10 in a section cut along the reference plane. Although not shown in FIG. 17, the third portion 25A3 of the first conductor 25A also has the convex portion 25A6 that protrudes toward the inside of the base body 10. The convex portion 25A6 protrudes from the inner peripheral surface of the first conductor 25A toward the inside of the base body 10.

The second conductor 25B has a concave portion 25B6 having a shape complementary to the convex portion 25A6 to receive the convex portion 25A6 therein. The concave portion 25B6 dents in the direction from the outer peripheral surface of the second conductor 25B toward the outside of the base body 10. The concave portion 25B6 receives at least a part of the convex portion 25A6.

In the embodiment of FIG. 17, in the section of the first conductor 25A cut along the reference plane, the dimension of a portion of the section that does not include the convex portion 25A6 is defined as a1. Alternatively, in the section of the first conductor 25A cut along the reference plane, the dimension of a portion of the section that includes the convex portion 25A6 may be defined as a1. In the illustrated embodiment, in the section of the second conductor 25B cut along the reference plane, the dimension of a portion of the section that does not include the convex portion 25B6 is defined as b1. Alternatively, in the section of the second conductor 25B cut along the reference plane, the dimension of a portion of the section that includes the convex portion 25B6 may be defined as b1. Whichever way the dimensions a1 and b1 are defined, the first aspect ratio may be greater than one and the second aspect ratio may be greater than one.

According to the embodiment of FIG. 17, the magnetic flux passing between the first conductor 25A and the second conductor 25B has a meandering path, thereby the magnetic flux can be made smaller than that of the embodiment shown in FIGS. 1 to 6. This allows the coupling coefficient to be further improved in the magnetic coupling coil component 1 of FIG. 17.

According to the embodiment shown in FIG. 17, since the convex portion 25A6 of the first conductor 25A and the concave portion 25B6 of the second conductor 25B are arranged such that they overlap in the L axis direction, the dimensions of the coil component 1 in the direction along the L axis can be reduced compared to the case where the convex portion 25A6 and the concave portion 25B6 are not provided. In addition, it is possible to reduce the difference between the length of the first conductor 25A along the current flowing direction and the length of the second conductor 25B along the current flowing direction. Therefore, the difference between the self-inductance of the first conductor 25A and the self-inductance of the second conductor 25B can be made smaller, thereby improving the coupling coefficient.

Figure 18:
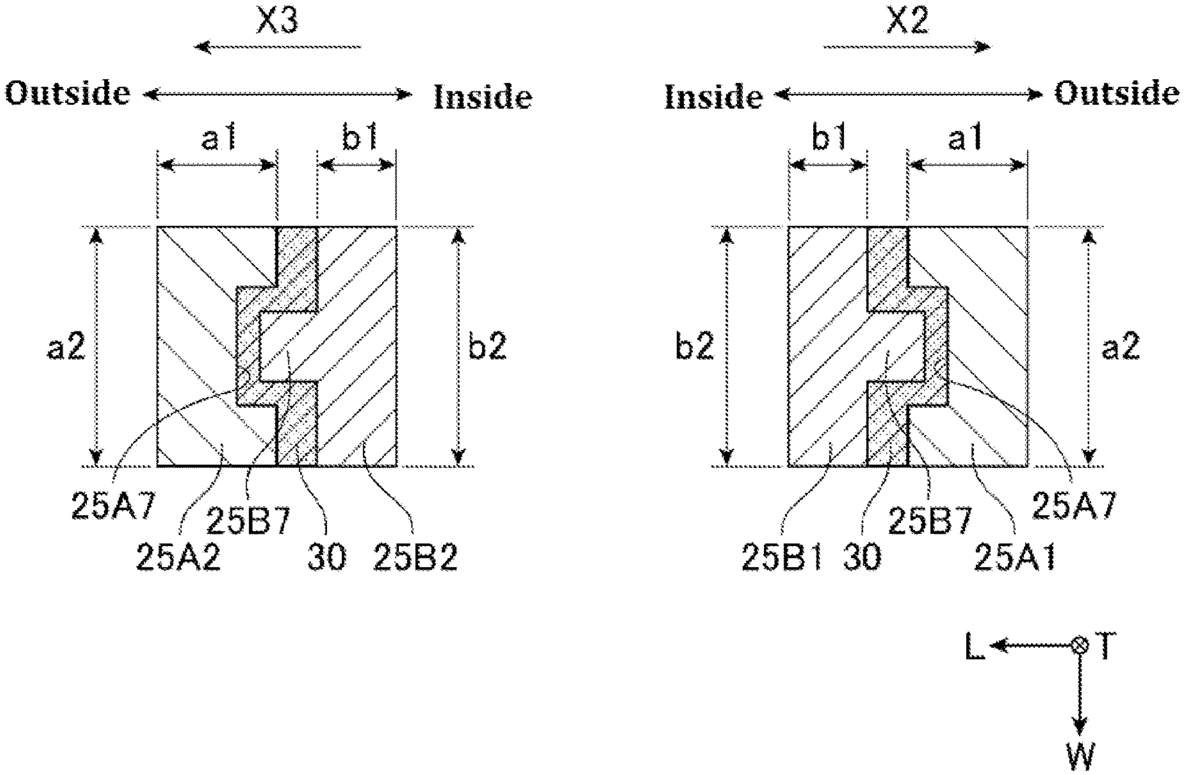
FIG. 18 is a sectional view of a magnetic coupling coil component according to yet another embodiment of the invention.

Yet another embodiment of the invention will be described with reference to FIG. 18. FIG. 18 is a III-III sectional view of a magnetic coupling coil component according to another embodiment of the invention. The embodiment shown in FIG. 18 is a modification example of the embodiment of FIG. 17. In the embodiment shown in FIG. 17, the first conductor 25A has the convex portion 25A6 and the second conductor 25B has the concave portion 25B6 that receives the convex portion 25A6 therein. Whereas in the embodiment shown in FIG. 18, the second conductor 25B has a convex portion 25A7 and the first conductor 25B has a concave portion 25B7 that receives the convex portion 25A7 therein. According to the embodiment of FIG. 18, the coupling coefficient can be improved and the dimension along the mounting surface can be reduced, as in the embodiment of FIG. 17.

Figure 19:
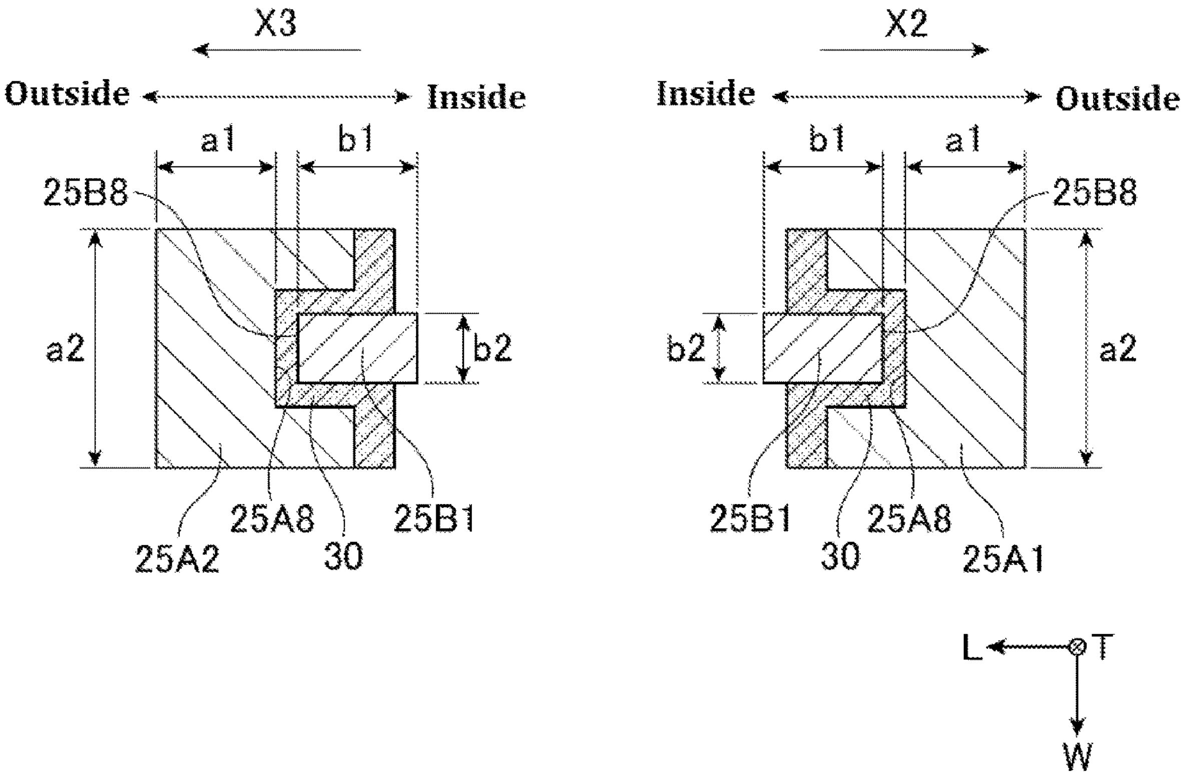
FIG. 19 is a sectional view of a magnetic coupling coil component according to still yet another embodiment of the invention.

Still another embodiment of the invention will be described with reference to FIG. 19. FIG. 19 is a III-III sectional view of a magnetic coupling coil component according to another embodiment of the invention. In the embodiment shown in FIG. 19, the sectional shapes of the first conductor 25A and the second conductor 25B cut along the reference plane are different from the sectional shapes of the first conductor 25A and the second conductor 25B that are shown in FIGS. 1 to 6. Specifically, the first portion 25A1 and the second portion 25A2 of the first conductor 25A each have, on its inner peripheral surface facing the second conductor, a concave portion 25A8 that dents toward the outside of the base body 10. Although not shown in FIG. 17, the third portion 25A3 of the first conductor 25A also has the convex portion that dents toward the outside of the base body 10. The second conductor 25B is configured to have the dimension b2, in the direction perpendicular to the reference direction, of the section cut along the reference plane. The dimension b2 is smaller than the dimension of the concave portion 25A8 in the direction perpendicular to the reference direction. The second conductor 25B is partially received in the concave portion 25A8 and partially protrudes from the concave portion 25A8.

In the illustrated embodiment, in the section of the first conductor 25A cut along the reference plane, the dimension of a portion of the section that does not include the concave portion 25A8 is defined as a1. Alternatively, in the section of the first conductor 25A, the dimension of a portion of the section that includes the concave portion 25A8 may be defined as a1. Whichever way the dimensions a1 and a1 are defined, the first aspect ratio may be greater than one. Unlike the embodiment of FIG. 6, the dimension b2, in the direction perpendicular to the reference direction, of the section of the second conductor 25B cut along the reference plane is smaller than a2, but the second aspect ratio may be greater than one.

According to the embodiment of FIG. 19, the magnetic flux generated when the current flowing through the first conductor 25A changes and the magnetic flux generated when the current flowing through the second conductor 25B changes hardly pass through the region (the region where the non-magnetic portion 30 is provided) between the first conductor 25A and the second conductor 25B. This allows the coupling coefficient to be further improved in the magnetic coupling coil component 1 of FIG. 19.

According to the embodiment shown in FIG. 19, since the concave portion 25A8 of the first conductor 25A and the outer peripheral surface 25B7 of the second conductor 25B are arranged such that they overlap in the L axis direction, the dimension of the coil component 1 in the direction along the L axis can be reduced compared to the case where the concave portion 25A8 is not provided. In addition, it is possible to reduce the difference between the length of the first conductor 25A along the current flowing direction and the length of the second conductor 25B along the current flowing direction. Therefore, the difference between the self-inductance of the first conductor 25A and the self-inductance of the second conductor 25B can be made smaller, thereby improving the coupling coefficient.

An exemplary method of manufacturing the coil component 1 according to one embodiment of the invention will now be described. In the manufacturing method described below, the first member 11 and the second member 12 forming the base body 10 are fabricated by a pressure molding process, the first conductor 25A and the second conductor 25B are provided on the inner sides of the first member 11 and the second member 12 respectively, and then the first member 11 and the second member 12 are bonded together to produce a magnetic coupling coil component 1. Steps of this exemplary manufacturing method will be now described specifically.

First, in order to fabricate the base body 10, the first member 11 and the second member 12 are fabricated. Specifically, a plurality of metallic magnetic particles are kneaded with a binder resin such as acrylic resin and a lubricant to obtain a slurry of mixed magnetic material. The obtained slurry is poured into a molding die and molding pressure is applied to obtain a molded body. The molding die for fabricating the first member 11 has a core for forming the groove 11*d* and cavities for forming the wall portion 11*a* and the raised portion 11*c*. Similarly, the molding die for fabricating the second member 12 has a core for forming the groove 12*d* and cavities for forming the wall portion 12*a* and the raised portion 12*c*. When the first member 11 and the second member 12 have the same shape, the first member 11 and the second member 12 are fabricated using the same molding die. Alternatively, a molding die without the core for fabricating the grooves 11*d* and 12*d* may be used to fabricate the molded body, and the grooves 11*d* and 12*d* may be later formed by grooving the molded body.

Subsequently, the molded body is degreased by heating. The degreased molded body is then heated at 600-850° C. to heat treat the metal magnetic particles. During this heat treatment, the surfaces of the metal magnetic particles are oxidized and an oxide film is formed on the surfaces of the metal magnetic particles. The oxide film is formed as the metal elements contained in the metal magnetic particles are oxidized. The metal magnetic particles are bonded to each other via the oxide film on their surface. The degreasing and heat treatment may be performed in a single step. In other words, the decreasing and heat treatment may be performed at the same time by heating the molded body before degreasing at 600-850° C. After the heat treatment, the first member 11 and the second member 12 are obtained.

The first conductor 25A and the second conductor 25B are formed by bending a metal plate made of a metal material such as Ag or Cu having a high electrical conductivity, by electrical discharge machining or bending process. The first conductor 25A is formed in the shape corresponding to the inner surface 11*a*1 of the wall portion 11*a* of the first member 11 and the inner surface 12*a*1 of the wall portion 12*a* of the second member 12. The second conductor 25B is formed in the shape corresponding to the outer surface 11*c*1 of the raised portion 11*c* of the first member 11 and the outer surface 12*c*1 of the raised portion 12*c* of the second member 12.

Subsequently, the first conductor 25A is provided along the inner surface 11*a*1 of the wall portion 11*a* of the first member 11. For example, adhesive may be applied to a part of the inner surface 11*a*1 of the wall portion 11*a* or a part of the outer peripheral surface of the first conductor 25A, and the first conductor 25A may be bonded to the inner surface 11*a*1 of the wall portion 11*a* of the first member 11 with the adhesive. The second conductor 25B is provided along the outer surface 11*c*1 of the raised portion 11*c* of the first member 11. For example, adhesive may be applied to a part of the outer surface 11*c*1 of the raised portion 11*c* or a part of the inner peripheral surface of the second conductor 25B, and the second conductor 25B may be bonded to the outer surface 11*c*1 of the raised portion 11*c* of the first member 11 with the adhesive.

Adhesive is then applied to the bonding surface of the first member 11 that is bonded to the second member 12, and the adhesive bonds the second member 12 to the first member 11. The adhesive hardens and becomes the bonding layer 13. A spacer (not shown) that is made of a resin material or a non-magnetic material such as glass and has a certain thickness may be provided on the bonding surface of the first member 11 that is bonded to the second member 12. The bonding layer 13 may include this spacer and the hardened adhesive. It is possible to adjust, by the spacer, the thickness of the bonding layer 13, which serves as the magnetic gap between the first member 11 and the second member 12. By bonding the first member 11 with the second member 12, the base body 10 is obtained.

One end of the first conductor 25A and one end of the second conductor 25B are exposed from the first opening 10A1 on the mounting surface 10*b* of the base body 10, and the other end of the first conductor 25A and the other end of the second conductor 25B are exposed from the second opening 10A2. The portions of the first conductor 25A that are exposed to the outside of the base body 10 from the openings 10A1 and 10A2 are bent along the mounting surface 10*b* of the base body 10 from the inside toward the outside of the base body 10, thereby forming the protruding portions 25A4 and 25A5. Similarly, the portions of the second conductor 25B that are exposed to the outside of the base body 10 from the openings 10A1 and 10A2 are bent along the mounting surface 10*b* of the base body 10 from the outside toward the inside of the base body 10, thereby forming the protruding portions 25B4 and 25B5. As described above, the magnetic coupling coil component 1 is obtained.

A part of the steps included in the above manufacturing method may be skipped as necessary. In the method of manufacturing the magnetic coupling coil component 1, a step(s) not explicitly described herein may be performed as necessary. Some of the steps included in the above-described method of manufacturing the magnetic coupling coil component 1 may be carried out in a different order as needed, without departing from the spirit of the present invention. Some of the steps included in the above-described method of manufacturing the magnetic coupling coil component 1 may be performed simultaneously or in parallel, if possible.

The coil component 1 according to the embodiment of FIG. 14 may be fabricated by forming a one-piece molded body that has a shape corresponding to the base body 10 by a compression molding process, heat treating the molded body to obtain the base body 10, and then inserting the first conductor 25A and the second conductor 25B into the through-hole 10A from the upper opening 10A3 on the upper surface 10*a*. In this case, the base body 10 is fabricated as the one-piece molded body by a compression molding process, instead of being made by jointing two molded bodies. Thus, the base body 10 without a magnetic gap can be obtained. This configuration can enhance the self-inductances of the first conductor 25A and the second conductor 25B.

At least one of the first conductor 25A or the second conductor 25B may be a metal laminate fabricated by stacking a plurality of thin metal plates. If the thickness of the metal plate increases, it may become more difficult to process it into the shape corresponding to the through-hole 10A. To address this, at least one of the first conductor 25A and the second conductor 25B may be fabricated by preparing two or more unit metal plates that are thinner than the total thickness of the first conductor 25A or the second conductor 25B, bending these unit metal plates into the shape corresponding to the through-hole 10A, and then laminating the bent unit metal plates together.

Alternatively, the coil component 1 may be formed by a thin film process.

Advantageous effects of the above embodiments will be now described. In the coil component 1 according to one or more embodiments of the invention, the second conductor 25B is disposed such that it faces the first conductor 25A and is spaced away from the first conductor 25A toward the inside of the base body 10. Therefore, the dimension of the magnetic coupling coil component 1 in the direction parallel to the mounting surface can be made smaller than that of the conventional magnetic coupling coil component.

According to one or more embodiments of the invention, the first conductor 25A is configured such that the first aspect ratio (a2/a1) is greater than one, and it faces the second conductor 25B on its wider side. In addition, the non-magnetic portion 30 is disposed between the first conductor 25A and the second conductor 25B. Therefore, compared with conventional magnetic coupling coil components in which the conductors arranged to face each other on their narrow sides are magnetically coupled, the magnetic flux passing through the region between the first conductor 25A and the second conductor 25B is reduced, which increases the coupling coefficient between the first conductor 25A and the second conductor 25B.

According to one or more embodiments of the invention, the second conductor 25B is configured such that the second aspect ratio (b2/b1) is greater than one, and it faces the first conductor 25A on its wider side. Therefore, compared with conventional magnetic coupling coil components in which the conductors arranged to face each other on their narrow sides are magnetically coupled, the magnetic flux passing through the region between the first conductor 25A and the second conductor 25B is reduced, which increases the coupling coefficient between the first conductor 25A and the second conductor 25B.

According to one or more embodiments of the invention, the sectional area of the first conductor 25A is larger than the sectional area of the second conductor 25B. According to one or more embodiments of the invention, the sectional area of the second conductor 25B is larger than the sectional area of the first conductor 25A. In conventional magnetic coupling coil components, the coil conductors of the two systems had the same sectional shape. Accordingly when current having different magnitude flow in the two systems, the conductors of the two systems were designed to have a sectional area of the conductor of the system in which a larger current flows. Therefore, the conductor of the system in which a smaller current flows had an excessively wide sectional area relative to the current flowing through it, and this hindered size reduction of the conventional magnetic coupling coil components. Whereas, according to one or more embodiments of the invention, the conductor of each system is designed to have a sectional area corresponding to the current flowing therethrough. For example, when a large current flows in a system including the first conductor 25A, the sectional area of the first conductor 25A can be made larger than that of the second conductor 25B. On the contrary, when a large current flows in the system including the second conductor 25B, the sectional area of the second conductor 25B can be made larger than that of the first conductor 25A.

According to one or more embodiments of the invention, in the sections cut along the reference plane, by making the dimension b1 of the second conductor 25B in the reference direction smaller than the dimension a1 of the first conductor 25A in the reference direction, it is possible to reduce a difference between the length of the first conductor 25A along the direction of current flowing therethrough (length of the axis line A) and the length of the second conductor 25B along the direction of current flowing therethrough (length of the axis line B). According to one or more embodiments of the invention, in the sections cut along the reference plane, by making the dimension a1 of the first conductor 25A in the reference direction smaller than the dimension b1 of the second conductor 25B in the reference direction, it is possible to reduce a difference between the length of the first conductor 25A along the direction of current flowing therethrough (length of the axis line A) and the length of the second conductor 25B along the direction of current flowing therethrough (length of the axis line B). By reducing the difference between the length of the axis line A and the length of the axis line B, it is possible to reduce a difference in the self-inductance between the first conductor 25A and the second conductor 25B.

According to one or more embodiments of the invention, the upper surface opening 10A3 is formed in the top surface 10*a* of the base body 10, and the first conductor 25A is configured and arranged such that it is exposed to the outside of the base body 10 through the upper surface opening 10A3. Thus, it is possible to increase the dimensions of the first and second conductors 25A and 25B in the direction perpendicular to the mounting surface without changing the external shape of the base body 10, and thereby increasing the self-inductances of the first and second conductors 25A and 25B.

According to one or more embodiments of the invention, the first conductor 25A has the convex portion 25A6 protruding toward the inside of the base 10, and at least a part of this convex portion 25A6 is received in the concave portion 25B6 formed in the second conductor 25B. This further reduces the magnetic flux that passes between the first conductor 25A and the second conductor 25B, thereby further improving the coupling coefficient of the coil component 1. In addition, since the convex portion 25A6 of the first conductor 25A and the concave portion 25B6 of the second conductor 25B are arranged such that they overlap in the L axis direction, the dimension of the coil component 1 in the direction along the L axis can be reduced. Moreover, it is possible to reduce the difference between the length of the first conductor 25A along the direction of current flowing therethrough and the length of the second conductor 25B along the direction of current flowing therethrough, thereby reducing the difference between the self-inductance of the first conductor 25A and the self-inductance of the second conductor 25B.

According to one or more embodiments of the invention, at least one of the first conductor 25A or the second conductor 25B is fabricated by bending a unit metal plate thinner than the overall thickness of the first conductor 25A or the second conductor 25B into the shape corresponding to the through-hole 10A of the base body 10, and then laminating the bent unit metal plates together. In this way, it is easy to process the first conductor 25A and the second conductor 25B into the shape that corresponds to the shape of the through-hole 10A.

According to one or more embodiments of the invention, except in the region where the first conductor 25A and the second conductor 25B contact the non-magnetic portion 30, the first conductor 25A and the second conductor 25B are surrounded by the base body 10 that has a relative magnetic permeability in the range of 30 to 60 and that contains the metal magnetic particles. In this case, the coupling coefficient between the first conductor 25A and the second conductor 25B can be made higher even if the volume of the base body 10 is reduced because the base body 10 has a high magnetic saturation property. In this way, by forming the base body 10 to contain the metal magnetic particles, the coupling coefficient between the first conductor 25A and the second conductor 25B can be improved and the size of the coil component 1 can be reduced.

According to one or more embodiments, magnetic saturation is prevented in the base body 10 of the coil component 1, and therefore, a large electric current is allowed to flow through the first conductor 25 and the second conductor 25B. For example, when the self-inductance L of the coil component 1 is smaller than 150 nH, it is possible to obtain an electric current per unit volume of 0.12 $A/mm^3$ or higher. When the self-inductance L of the coil component 1 is smaller than 100 nH, it is possible to obtain an electric current per unit volume of 0.16 $A/mm^3$ or higher. When the self-inductance L of the coil component 1 is smaller than 75 nH, it is possible to obtain an electric current per unit volume of 0.20 $A/mm^3$ or higher.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

What is claimed is:

1. A magnetic coupling coil component, comprising:

a magnetic base body having a mounting surface and a through-hole connecting a first opening and a second opening in the mounting surface;

a first conductor disposed in the through-hole such that one end thereof is exposed through the first opening and the other end thereof is exposed through the second opening; and a second conductor disposed in the through-hole at a position spaced away from the first conductor toward inside of the magnetic base body, the second conductor being opposed to the first conductor, one end of the second conductor being exposed through the first opening and the other end thereof being exposed through the second opening; and a non-magnetic portion disposed between the first conductor and the second conductor and having a relative magnetic permeability smaller than a relative magnetic permeability of the magnetic base body, the non-magnetic portion being formed of a non-magnetic material, wherein the first conductor is spaced away from the second conductor in a reference direction from the inside to outside of the magnetic base body in a section perpendicular to a direction of current flowing through the first conductor, wherein the first conductor has a first exposed surface exposed on an outside of the first opening, a second exposed surface exposed on an outside of the second opening, and an inner peripheral surface extending from the first exposed surface and the second exposed surface, and wherein the non-magnetic portion extends an entire length of the inner peripheral surface of the first conductor such that the non-magnetic portion contacts the inner peripheral surface of the first conductor along the entire length thereof.

2. The magnetic coupling coil component of claim 1, wherein a first aspect ratio, which is a ratio of a dimension of the section of the first conductor in a direction perpendicular to the reference direction to a dimension of the section of the first conductor in the reference direction, is greater than one.

3. The magnetic coupling coil component of claim 2, wherein a second aspect ratio, which is a ratio of a dimension of the section of the second conductor in a direction perpendicular to the reference direction to a dimension of the section of the second conductor in the reference direction, is greater than one.

4. The magnetic coupling coil component of claim 2, wherein a sectional area of the first conductor cut in the section is larger than a sectional area of the second conductor cut in the section.

5. The magnetic coupling coil component of claim 2, wherein a dimension of the section of the second conductor in the reference direction is smaller than a dimension of the section of the first conductor in the reference direction.

6. The magnetic coupling coil component of claim 2, wherein a sectional area of the second conductor cut in the section is larger than a sectional area of the first conductor cut in the section.

7. The magnetic coupling coil component of claim 2, wherein a dimension of the section of the first conductor in the reference direction is smaller than a dimension of the section of the second conductor in the reference direction.

8. The magnetic coupling coil component of claim 1, wherein the magnetic base body has an upper surface opposed to the mounting surface, wherein the through hole communicates with outside of the magnetic base body through a third opening in the upper surface of the magnetic base body, and wherein a part of the first conductor is exposed to the outside of the magnetic base through the third opening in the upper surface.

9. The magnetic coupling coil component of claim 1, wherein the first conductor has a convex portion that protrudes toward the inside of the magnetic base body in the section, and wherein the second conductor has a concave portion that has a shape complementary to the convex portion and accepts at least a portion of the convex portion.

10. The magnetic coupling coil component of claim 1, wherein the first conductor has, on its inner peripheral surface facing the second conductor, a concave portion that dents toward outside of the magnetic base body in a section perpendicular to a direction of current flowing through the first conductor, and wherein at least a part of the second conductor is received in the concave portion.

11. The magnetic coupling coil component of claim 10, wherein the second conductor has a convex portion that protrudes toward outside of the magnetic base body in the section, and wherein the concave portion receives at least a part of the convex portion.

12. The magnetic coupling coil component of claim 1, wherein the first conductor includes a first unit member and a second unit member, the second member is disposed on an inner side of the magnetic base body than the first unit member, one end of the first unit member is exposed through the first opening and the other end of the first unit member is exposed through the second opening, and one end of the second unit member is exposed through the first opening and the other end of the second unit member is exposed through the second opening.

13. The magnetic coupling coil component of claim 1, wherein the magnetic base body has an upper surface opposed to the mounting surface, and wherein, in a cross section along a plane passing through the first conductor, the second conductor, the upper surface, and the mounting surface, a shortest distance between an axis line of the first conductor and the upper top-surface is less than one-half a distance between the upper surface and the mounting surface.

14. The magnetic coupling coil component of claim 1, wherein the magnetic base body contains a plurality of metal magnetic particles.

15. The magnetic coupling coil component of claim 1, wherein the magnetic base body includes a first member and a second member bonded to the first member via a bonding layer.

16. The magnetic coupling coil component of claim 1, wherein the magnetic base body has an upper surface facing the mounting surface, a first end surface connecting the mounting surface and the upper surface, and a second end surface facing the first end surface, and wherein a distance between the upper surface and the mounting surface is greater than a distance between the first end surface and the second end surface.

17. The magnetic coupling coil component of claim 1, wherein at least one of the first conductor or the second conductor is covered by an insulating film.

18. A circuit board comprising the magnetic coupling coil component of claim 1.

19. An electronic device comprising the circuit board of claim 18.

20. The magnetic coupling coil component of claim 1, wherein the inner peripheral surface of the first conductor is not exposed on the outside of the first and second openings, the first exposed surface and the second exposed surface of the first conductor are parallel to the mounting surface, and the inner peripheral surface of the first conductor is perpendicularly connected to the first exposed surface and the second exposed surface respectively.

21. The magnetic coupling coil component of claim 1, wherein the second conductor has at the one and other ends thereof a first protruding portion and a second protruding portion, the first protruding portion and the second protruding portion protruding in a direction parallel to the mounting surface and toward each other, and wherein part of the magnetic base body fills in a space between the first protruding portion and the second protruding portion.

* * * * *